(12) United States Patent
Carlson

(10) Patent No.: US 12,215,745 B1
(45) Date of Patent: Feb. 4, 2025

(54) TORQUE TRANSFERRING COUPLER

(71) Applicant: Anduril Industries, Inc., Irvine, CA (US)

(72) Inventor: McHenry Carlson, Tustin, CA (US)

(73) Assignee: Anduril Industries, Inc., Costa Mesa, CA (US)

( * ) Notice: Subject to any disclaimer, the term of this patent is extended or adjusted under 35 U.S.C. 154(b) by 366 days.

(21) Appl. No.: 17/573,496

(22) Filed: Jan. 11, 2022

(51) Int. Cl.
*F16D 25/062* (2006.01)
*F16D 1/116* (2006.01)

(52) U.S. Cl.
CPC ............ *F16D 25/062* (2013.01); *F16D 1/116* (2013.01); *Y10T 403/556* (2015.01); *Y10T 403/559* (2015.01)

(58) Field of Classification Search
CPC .... F16D 25/062; F16D 1/116; Y10T 403/556; Y10T 403/559
USPC .................................................. 403/296, 298
See application file for complete search history.

(56) References Cited

U.S. PATENT DOCUMENTS

| | | | | | |
|---|---|---|---|---|---|
| 2,576,069 | A | * | 11/1951 | Wilton | B25B 23/141 |
| 3,880,267 | A | * | 4/1975 | Auble | F16D 11/14 |
| 6,726,395 | B2 | * | 4/2004 | Yu | F16B 7/182 |
| | | | | | 403/296 |
| 8,512,157 | B2 | * | 8/2013 | Harada | F16D 1/076 |

FOREIGN PATENT DOCUMENTS

FR          749550 A   *   7/1933 ....................... 464/38

* cited by examiner

*Primary Examiner* — Greg Binda
(74) *Attorney, Agent, or Firm* — Van Pelt, Yi & James LLP

(57) ABSTRACT

A device includes an inner cylinder and an outer cylinder. The inner cylinder has a radial face including a first set of curved structures. The outer cylinder has an axial face including a second set of curved structures. A coupling is formed in response to a section of the outer cylinder disposed to surround a portion of the inner cylinder and the first set of curved structures of the inner cylinder disposed to interlock with the second set of curved structures of the outer cylinder.

18 Claims, 18 Drawing Sheets

TORQUE TRANSFERRING COUPLER

BACKGROUND OF THE INVENTION

Traditional coupling devices or methods (e.g., a flange coupling, a set screw, a keyway, a traditional spline, a shrink fit, or a press fit) can be variously bulky, expensive to manufacture or assemble, have excessive backlash, require excessive force to secure the coupling, be prone to assembly or positioning error, break, and/or come undone during use (e.g., in high torque or high vibration environments).

BRIEF DESCRIPTION OF THE DRAWINGS

Various embodiments of the invention are disclosed in the following detailed description and the accompanying drawings.

DETAILED DESCRIPTION

Figure 1A:
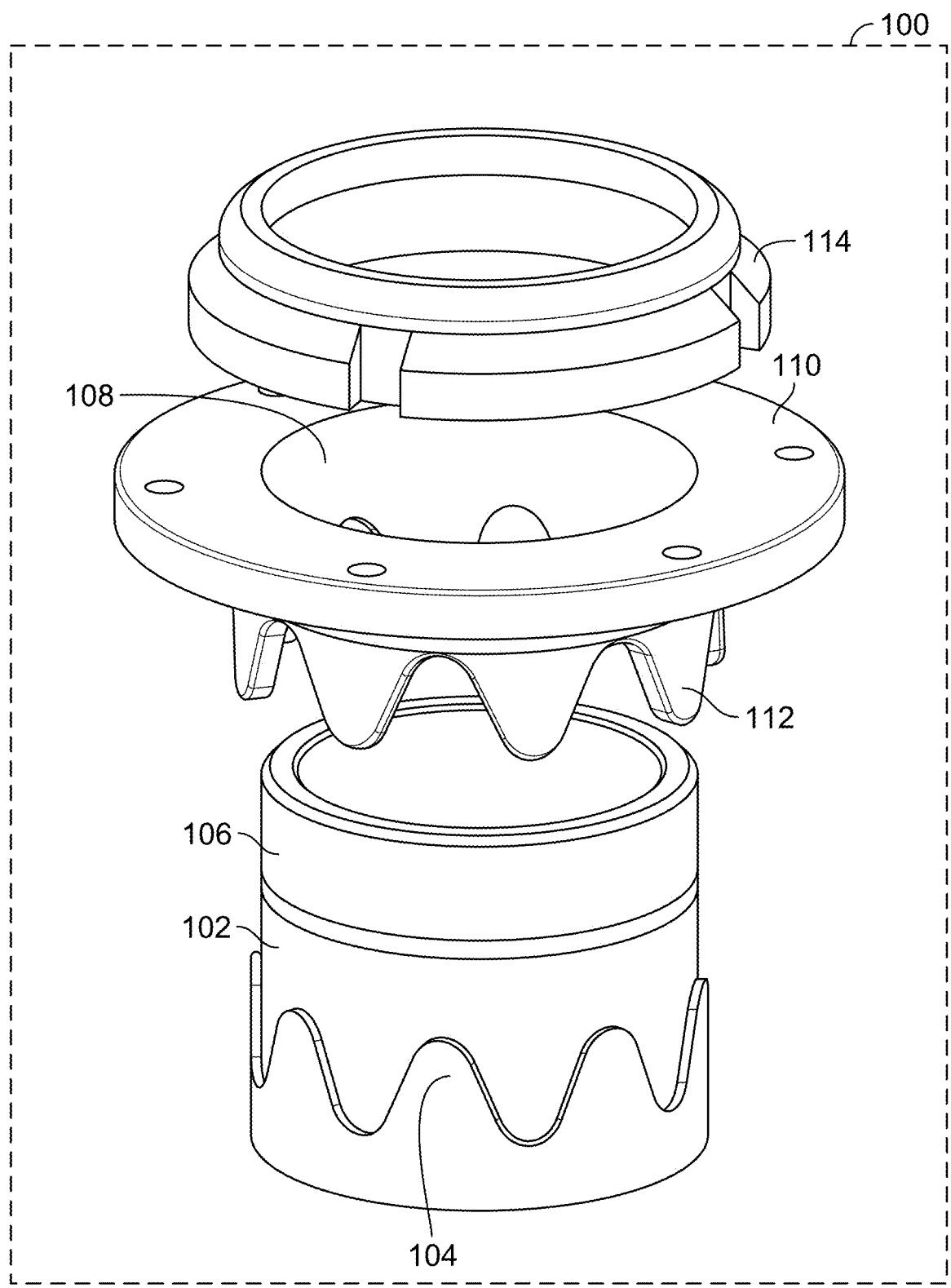
FIG. 1A is a block diagram illustrating an embodiment of a torque transferring coupler.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A device for coupling equipment is disclosed (i.e., a 'torque transferring coupler'). The torque transferring coupler comprises an inner cylinder, wherein the inner cylinder has a radial face comprising a first set of curved structures; and an outer cylinder, wherein the outer cylinder has an axial face comprising a second set of curved structures, wherein a coupling is formed in response to a section of the outer cylinder disposed to surround a portion of the inner cylinder and the first set of curved structures of the inner cylinder disposed to interlock with the second set of curved structures of the outer cylinder. In some embodiments, the first set of curved structures and the second set of curved structures have smoothly matching profiles (e.g., the profiles are wave-like, have no points of discontinuities, no sharp edges, etc.). In some embodiments, the smoothly matching profiles are not matching in horizontal regions of the curved structures (e.g., the horizontal regions are perpendicular to the axis of the coupler). In some embodiments, there is a spatial offset (e.g., no contact) for horizontal regions to reduce manufacturing tolerance requirements (e.g., in response a horizontal region or point contacting before a sloped surface due to inaccurate manufacturing, backlash would result for the coupler). In various embodiments, the sets of curved structures comprise wave-like splines (i.e., 'wave splines').

The disclosed torque transferring coupler (TTC) is useful in connecting equipment for the purpose of transmitting power and/or rotational motion. For example, the TTC is used to attach a shaft (e.g., a drive shaft) to an object (e.g., a driven shaft, a pulley, a gear, a flange, a wheel, etc.).

In some embodiments, the inner cylinder of the TTC continues to a longer shaft (e.g., a drive shaft). In some embodiments, the inner cylinder of the TTC is continuous with (i.e., is integral to) a longer shaft (e.g., a drive shaft). In some embodiments, the inner cylinder of the TTC is attached to a longer drive shaft (e.g., attached via a flange added to the inner cylinder below the wave splines). In various embodiments, the wave splines of the inner cylinder stand proud of, are flush with, are shy of the longer drive shaft's diameter, or any other appropriate relation between the wave splines and the inner cylinder. In various embodiments, the outer cylinder wave splines are shaped in the entire thickness of the outer cylinder, the inner surface of the outer cylinder, stand proud of the inner surface of the outer cylinder, are flush with the inner surface of the outer cylinder, are shy of the inner surface of the outer cylinder, or have any other appropriate relation with the surfaces of the outer cylinder.

The TTC is similar to a curvic coupling, in that there are torque-transmitting teeth, or splines, that provide a self-centering effect due to the angle of the splines all pointing towards the center. The difference is that curvic couplings typically have the splines on an axial face, whereas the disclosed device has the splines on a radial or cylindrical face. The curved structure, or wave-like, design of the TTC splines (i.e., wave splines) results in a low profile (e.g., it can fit in relatively thin-walled tube) that is easier and more cost effective to manufacture than traditional coupling designs (e.g., the TTC can be made in a standard live-tooling lathe, with the wave splines milled in with an orthogonal spindle head; or by using a 3-axis mill with 3-dimensional tool pathing). Manufacturing cost effectiveness is also gained by (i) allowing the use of lower cost/lower strength materials (as the large contact area of the wave splines results in reduced material stress), and (ii) reduced assembly tooling required.

Additionally, the wave-like design of the TTC splines results in minimal backlash, high radial torque transfer (e.g., by using steep-angled wave splines), ease of assembly, precise and repeatable positioning, and allows for multiple possible configurations (e.g., multiple axial offsets/positions and/or mistake-proof radial positioning).

In some embodiments, the TTC comprises an inner cylinder that is threaded. In some embodiments, the TTC further comprises a nut, wherein the nut is disposed to secure the coupling. The TTC embodiment comprising a threaded inner cylinder and matching nut is an improvement over coupling devices that require a large amount of torque (e.g., enough torque to cause friction for radial torque resistance) applied to the nut during assembly to obtain a large amount of radial torque resistance. For example, a traditional coupling mechanism that relies on friction under a bolt head to provide some torque resistance is very easy to assemble and manufacture, but torque resistance is typically low. As a specific example, consider a motor shaft that has a female threaded hole down the center of the shaft, then a pulley or gear with a through hole is slid on to the shaft, and a threaded bolt is used to clamp the pulley onto the motor shaft. Assembly of these types of coupling devices requires high performance tooling such as torque impact drivers, or manual torque wrenches and a fixture to hold the shaft to counteract the torque applied to the nut during assembly. In contrast, the disclosed TTC embodiment requires only a small amount of torque (e.g., enough torque to keep TTC from displacing axially and enabling the spline structure to apply torque, 10 Nm of torque or less, etc.) applied to the nut to gain the torque transfer advantages provided by the TTC's wave spline interface.

The TTC is also an improvement over other traditional coupling devices or methods (e.g., a flange coupling, a set screw, a keyway, a traditional spline, a shrink fit, a press fit, etc.). For example, a flange coupling, comprising two flanges fastened to each other (e.g., two flanges bolted together with a bolt pattern). In some instances, a flange coupling comprises through-holes in both flanges, wherein a bolt and nut or a bolt and threaded hole are used to fasten the two flanges together. However, the disadvantage of the two flanges bolted together is that the coupling requires a larger diameter in order to have enough room for the holes in the axial direction. In contrast, the TTC can be made with a significantly smaller overall maximum diameter because the torque transmitting features are a part of the shaft cylinder.

Set screws (e.g., as used in a coupling collar) applied radially to a drive shaft can dig in, galling the shaft, and are prone to slipping, especially under load reversal. In contrast, the TTC's interlocking wave splines distributes rotational torque over a large contact area, thereby reducing stress in the material and eliminating the galling issues associated with set screws. Additionally, the symmetry of the interlocking wave splines provides equivalent radial torque resistance when the load is driven in either rotational direction, thereby eliminating slippage even under load reversal.

A keyway experiences backlash during load reversal and is dependent on the precision of manufacturing (e.g., broaching, wire electrical discharge machining (EDM), etc.). Traditional splines—projections on a shaft (e.g., a rectangular key) that fit into slots or grooves on a corresponding shaft, hub, or wheel—are economically costly, and the female side of a traditional spline coupling requires special tooling during manufacture (e.g., broaching, plunge EDM, etc.). In contrast, the symmetry of the TTC's interlocking wave splines, the large contact area of the wave splines, and the precise positioning that comes from the design of the interlocking wave splines, together result in minimal backlash. As long as there is no contact at any of the horizontal points along the TTC's wave splines that would negate the interlocking of the inner and outer cylinder wave splines, and not allow the angled wave splines to be fully in contact, backlash is essentially eliminated. That is, any resultant backlash is minimal to the point of requiring high-precision measurement systems (e.g., a laser-based measurement system) to detect even the slightest amount of backlash—what the industry refers to as 'zero-backlash'.

Thus, the precision and cost of manufacturing of the wave spline design is considerably lessened in comparison to that required for the use of a keyway or traditional spline.

A shrink fit (e.g., a sweat fit) or a press fit require very tight dimensional tolerances to obtain the right amount of friction or grip in a coupling. Additionally, both methods require special tooling during assembly (e.g., an inductive heater, a blow torch, an oven, a hydraulic press, an arbor press, etc.). In contrast, the TTC depends on the contact between the interlocking wave splines and not friction as provided by a shrink or press fit. Additionally, the TTC is easy to assemble, requiring no special tooling during assembly.

In various embodiments, the inner cylinder, the outer cylinder, and/or the nut comprise one or more of the following materials: a metal, a plastic, a ceramic, and/or any other appropriate material. Other materials used to manufacture the TTC include surface-hardened (i.e., case-hardened) steel alloys. The hard outer layer of case-hardened steel alloys improves surface wear resistance of repeated installation/removal processes, but because the inner material remains relatively soft, it remains resistant to fracturing during high torque applications, cycling loads, or load reversals.

High strength steels are also common in high torque applications such as motor shafts and pair well with a minimally constrained application, where three points of Hertzian contact are used to transmit the rotational torque. Increasing the surface area of contact will increase torque resistance, but minimally constraining the outer cylinder around the inner cylinder with only three points of contact increases the clocking accuracy of the install. In the minimally constrained configuration, Hertzian contact stress is an appropriate method of measuring the stress induced during torque application.

Common plastics such as acrylonitrile butadiene styrene (ABS) are good low strength candidates. Due to the lower stiffness compared to metals, plastic construction pairs well with a high surface area configuration (i.e., a large contact area between opposing wave splines). A large contact surface area results in reduced material stress which means that for some applications, low strength, low-cost materials can be used in place of higher cost, higher strength materials. Aluminum is easy to machine and is a good middle ground candidate for the material selection of these parts; any configuration can be used, depending on the torque of the application.

FIG. 1A is a block diagram illustrating an embodiment of a torque transferring coupler. In the example shown, torque transferring coupler (TTC) 100 comprises inner cylinder 102, outer cylinder 108, and nut 114. In some embodiments, nut 114 couples to inner cylinder 102. Inner cylinder 102 comprises wave splines 104 and threaded region 106. Outer cylinder 108 comprises flange 110 and wave splines 112. In various embodiments, flange 110 is used to couple TTC 100 to a driven shaft, a pulley, a gear, a flange, a wheel, etc.

The wave splines 112 of outer cylinder 108 are disposed to interlock with wave splines 104 of inner cylinder 102. Once wave splines 104 and wave splines 112 are interlocked (e.g., by positioning outer cylinder 108 around inner cylinder 102), nut 114 is used to secure the coupling by being threaded onto threaded region 106. In various embodiments, nut 114 comprises one of the following: a hexagonal nut, a square nut, a ring nut, a cap nut, a capstan nut, a dome nut, a wingnut, a thumb nut, etc. In some embodiments, only a small amount of install torque is needed to secure nut 114 to gain the advantages of the wave spline interface.

In some embodiments, torque applied to a nut or bolt, and its relation to preload is well understood, but friction creates large uncertainty. Unfortunately, friction causes significant variability in the amount of preload in a fastener even when extremely accurate torque is applied. Uncertainty can be somewhat reduced by using a low friction thread lubricant, but uncertainty will never be fully reduced due to friction under the head of the bolt. If we do not consider friction, the mechanical advantage of a threaded fastener is the circumference of the pitch circle divided by the thread pitch (e.g., 2*pi*radius of nut/thread pitch). If friction is considered, the useful mechanical advantage is typically reduced by about 90% due to thread running torque, as well as under-head torque. Even when accounting for things like thread lubricant, thread class, material, coefficient of friction, the scatter in achieved preload can be expected to vary by +/−30%.

In some embodiments, the torque required on the nut in order to get the wave splines to function must be high enough to ensure that the horizontal component of the normal force reacted by the force of the nut is greater than the horizontal component of the force experienced during the torque application. Adequately pre-loaded joints (e.g., where the preload exceeds the applied load) have better fatigue life than joints in which applied load exceeds preload. Exceeding the preload also causes gapping (which would induce backlash in this torque transferring coupler). Therefore it is critical to torque the top nut adequately, depending on how much torque the system will experience.

In some embodiments, there are two mechanisms at play that use mechanical advantage to magnify the amount of torque the coupling can resist: 1) the mechanical advantage of the threaded nut, which forces the interlocking wave splines together; this is equal to the circumference of the pitch circle divided by the thread pitch, where a larger cylinder diameter and finer pitch threads increase the mechanical advantage; and 2) the mechanical advantage of the angle of the wave splines; this is equal to the tangent of the angle of the splines, where steeper angled splines increase the mechanical advantage.

In some embodiments, an example of calculation results is as follows: 1) desired torque resistance (torque of the load)—271 Nm, 2) cylinder diameter—50.0 mm, 3) thread pitch—1.5 mm, 4) angle of splines—70.0 degrees, 5) friction knockdown 90%, 6) mechanical advantage of threaded connection (no friction)—104.7 (e.g., 2*pi*cylinder diameter/2)/thread pitch), 7) mechanical advantage of splines—2.7 (e.g., tan(angle of splines in radians)), 8) total mechanical advantage (no friction)—287.7 (e.g., the mechanical advantage of threaded connection (no friction)*mechanical advantage of splines), 9) total mechanical advantage (with friction)—28.8 (e.g., (1−friction knockdown)*mechanical advantage of threaded connection (no friction)*mechanical advantage of splines), and 10) required input torque on the nut (with friction)—9.4 Nm (e.g., desired torque resistance (torque of the load)/total mechanical advantage (with friction)).

In some embodiments, a locking feature on nut 114 provides additional security against nut 114 from coming loose. In various embodiments, nut 114 comprises one of the following: a tangential clamp nut, a nylon-insert lock nut, a castellated nut, a pair of jam nuts, a Stover lock nut, a two-way lock nut, a serrated flange lock nut, a K-lock nut, etc. In various embodiments, a separate locking feature is used in combination with nut 114 (e.g., a thread locker compound, a lockwasher, a cotter pin, etc.).

In various embodiments, inner cylinder 102 is a solid cylinder or a hollow cylinder. In various embodiments, a solid or hollow form of inner cylinder 102 is manufactured starting from bar stock (e.g., using a lathe to form the cylindrical shape). In various embodiments, a hollow form of inner cylinder 102 is manufactured by boring an inner region of solid bar stock or by starting with hollow tube stock (e.g., metal tube stock). In some embodiments, threaded region 106 of inner cylinder 102 is added using a lathe, a mill, a die, or by any other appropriate means. In various embodiments, inner cylinder 102, wave splines 104, and/or threaded region 106 are manufactured using a standard live-tooling lathe (e.g., with wave splines 104 milled in with an orthogonal spindle head), or by using a 3-axis mill with 3-dimensional tool pathing. In various embodiments, wave splines 104 are manufactured on a separate hollow cylinder that is attached or fused around a separate inner cylinder (e.g., by welding, heat fusing, shrink fitting, press fitting, or by any other appropriate means) so as to create inner cylinder 102 with the raised structure of wave splines 104 on the surface of inner cylinder 102.

In some embodiments, wave splines 104 have a first wave profile and wave splines 112 have a second wave profile. In some embodiments, wave splines 104 and wave splines 112 interlock with a first point of wave splines 104 contacting a second point of wave splines 112. In some embodiments, wave splines 104 and wave splines 112 interlock with a first section of wave splines 104 contacting a second section of wave splines 112. In some embodiments, wave splines 104 and wave splines 112 interlock with a first line segment of wave splines 104 contacting a second line segment of wave splines 112. In some embodiments, wave splines 104 and wave splines 112 interlock together providing a low backlash coupling.

Figure 1B:
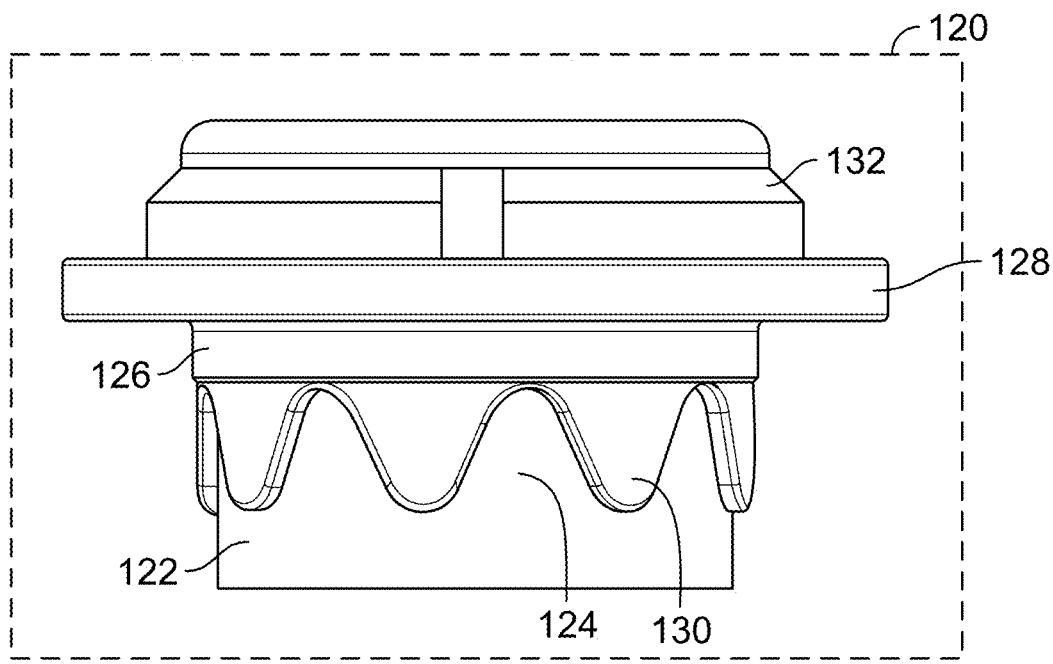
FIG. 1B is a block diagram illustrating a side view of an embodiment of a torque transferring coupler.

FIG. 1B is a block diagram illustrating a side view of an embodiment of a torque transferring coupler. In some embodiments, TTC 120 comprises TTC 100 of FIG. 1A. In the example shown, TTC 120 comprises inner cylinder 122 with wave splines 124, outer cylinder 126 with flange 128 and wave splines 130, and nut 132. In the example shown, wave splines 124 and wave splines 130 are interlocked by having positioned outer cylinder 126 around inner cylinder 122. Nut 132 has been threaded onto a threaded region (not shown) of inner cylinder 122 to secure the coupling.

In the example shown, wave splines 124 are integral to inner cylinder 122 and stand shy of wave splines 130. By making wave splines 124 shy of wave splines 130, inner cylinder 122 maintains a low surface profile (e.g., relative to an integral longer drive shaft), one of the key characteristics of this assembly. In the example shown, wave splines 130 of outer cylinder 126 need to be thicker because there is no cylindrical support material (e.g., to provide radial torque resistance).

In various embodiments, wave splines 124 of inner cylinder 122 stand proud of wave splines 130 (in an interlocked configuration the outer surface of the wave splines 124 has a larger radius than the outer surface of the wave splines 130), the wave splines 124 of the inner cylinder 122 are flush with wave splines 130 (in an interlocked configuration the outer surface of the wave splines 124 is radially aligned with the outer surface of the wave splines 130), or the wave splines 124 of the inner cylinder 122 stand shy of the wave splines 130 (in an interlocked configuration the outer surface of the wave splines 124 has a smaller radius than the outer surface of the wave splines 130), or any other appropriate relation between wave splines 124 and wave splines 130.

In some embodiments, wave splines 124 and/or and wave splines 130 have a periodicity. In some embodiments, wave splines 124 and/or and wave splines 130 have a single frequency. In some embodiments, wave splines 124 and/or and wave splines 130 each comprise multiple frequencies. In some embodiments, wave splines 124 and/or and wave splines 130 each has a single amplitude. In some embodiments, wave splines 124 and/or and wave splines 130 each comprise multiple amplitudes.

Figure 1C:
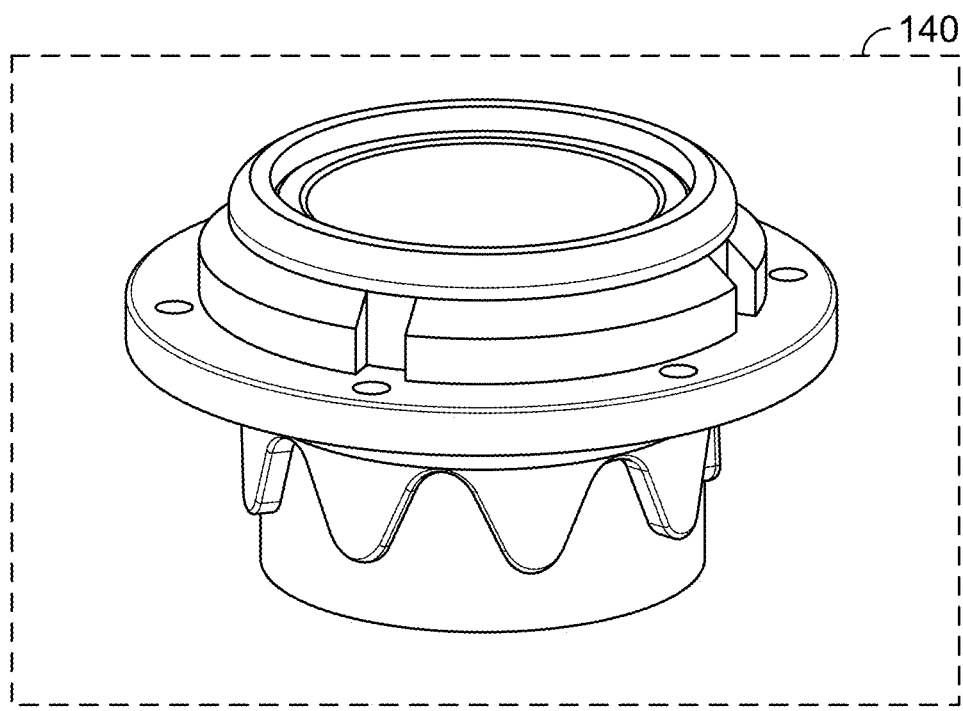
FIG. 1C is a block diagram illustrating a perspective view of an embodiment of a torque transferring coupler.

FIG. 1C is a block diagram illustrating a perspective view of an embodiment of a torque transferring coupler. In some embodiments, TTC 140 comprises TTC 100 of FIG. 1A. In the example shown, TTC 140 is a perspective view of TTC 120 of FIG. 1B.

Figure 1D:
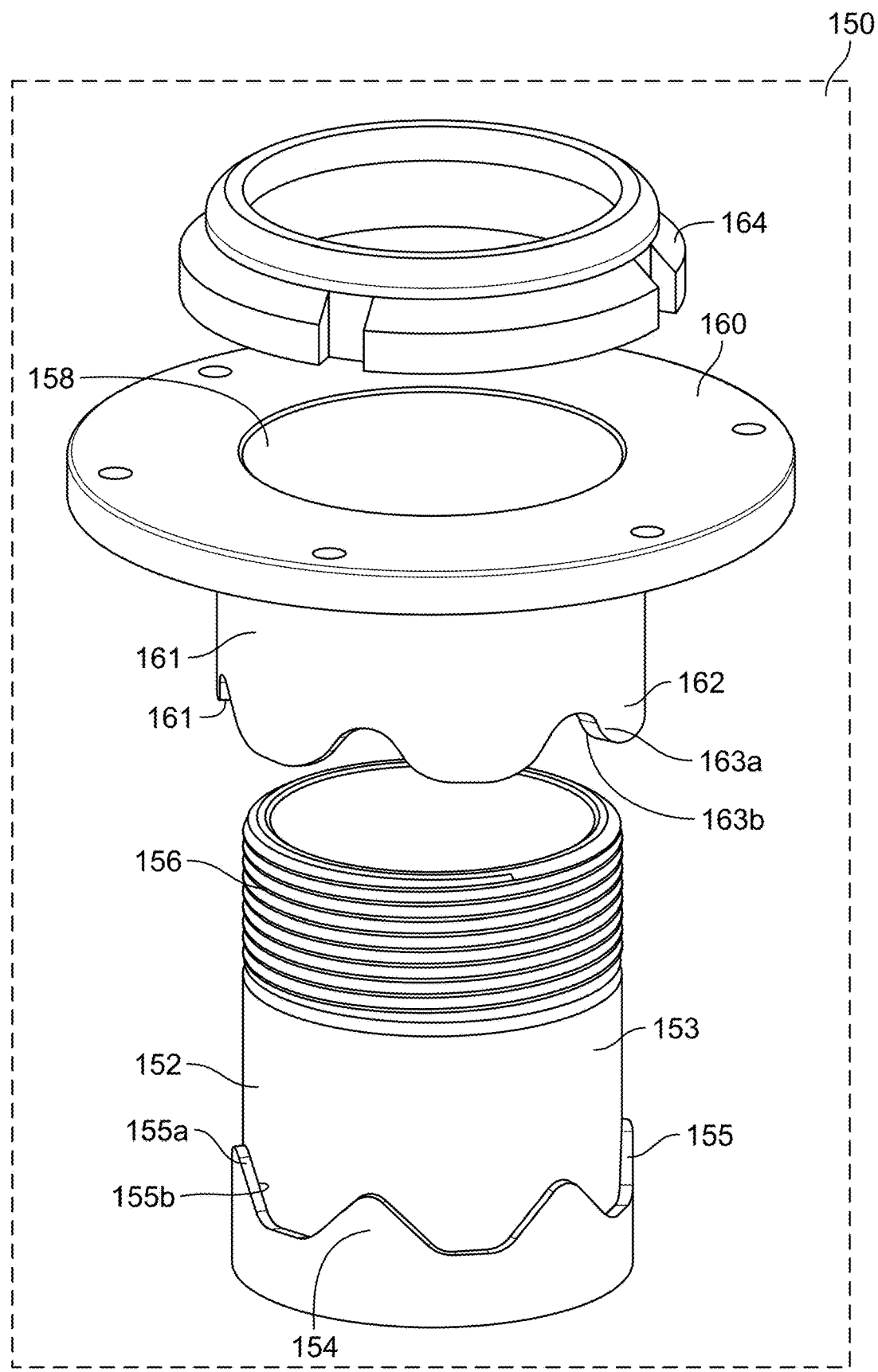
FIG. 1D is a block diagram illustrating an embodiment of a torque transferring coupler.

FIG. 1D is a block diagram illustrating an embodiment of a torque transferring coupler. In the example shown, torque transferring coupler (TTC) 150 comprises inner cylinder 152, outer cylinder 158, and nut 164. In some embodiments, nut 164 couples to inner cylinder 152. Inner cylinder 152 comprises wave splines 154 and threaded region 156. Outer cylinder 158 comprises flange 160 and wave splines 162. In various embodiments, flange 160 is used to couple TTC 150 to a driven shaft, a pulley, a gear, a flange, a wheel, etc.

The wave splines 162 of outer cylinder 158 are disposed to interlock with wave splines 154 of inner cylinder 152. Once wave splines 154 and wave splines 162 are interlocked (e.g., by positioning outer cylinder 158 around inner cylinder 152), nut 164 is used to secure the coupling by being threaded onto threaded region 156. In various embodiments, nut 164 comprises one of the following: a hexagonal nut, a square nut, a ring nut, a cap nut, a capstan nut, a dome nut, a wingnut, a thumb nut, etc. In some embodiments, only a relatively small amount of install torque is needed to secure nut 164 to gain the advantages of the wave spline interface.

In some embodiments, torque applied to a nut or bolt, and its relation to preload is well understood, but friction creates large uncertainty. Unfortunately, friction causes significant variability in the amount of preload in a fastener even when extremely accurate torque is applied. Uncertainty can be reduced by using a low friction thread lubricant, but it will never be fully certain due to friction under the head of the bolt. For this reason, friction is ignored, as this assembly does not do anything to solve that problem. If we do not consider friction, the mechanical advantage of a threaded fastener is the circumference of the pitch circle divided by the thread pitch (e.g., 2*pi*radius of nut/thread pitch). If friction is not considered, the useful mechanical advantage is typically reduced by about 90% due to thread torque, as well as under-head torque. Even when accounting for things like thread lubricant, thread class, material, coefficient of friction, the scatter in achieved preload can be expected to vary by +/−30%.

In some embodiments, the torque required on the nut to get the wave splines to work to ensure that the horizontal component of the normal force reacted by the force of the nut is greater than the horizontal component of the force experienced during the torque application. Adequately preloaded joints (e.g., where the preload exceeds the applied load) have better fatigue life than joints in which applied load exceeds preload. Exceeding the preload also causes gapping (which would induce backlash in this torque transferring coupler). Therefore it is critical to torque the top nut adequately, depending on how much torque the system will experience.

In some embodiments, there are two mechanisms at play that use mechanical advantage to magnify the amount of torque the coupling can resist: 1) the mechanical advantage of the threaded nut, which forces the interlocking wave splines together; this is equal to the circumference of the pitch circle divided by the thread pitch, where a larger cylinder diameter and finer pitch threads increase the mechanical advantage; and 2) the mechanical advantage of the angle of the wave splines; this is equal to the tangent of the angle of the splines, where steeper angled splines increase the mechanical advantage.

In some embodiments, an example of calculation results is as follows: 1) desired torque resistance (torque of the load)—271 Nm, 2) cylinder diameter—50.0 mm, 3) thread pitch—1.5 mm, 4) angle of splines—70.0 degrees, 5) friction knockdown 90%, 6) mechanical advantage of threaded connection (no friction)—104.7, 7) mechanical advantage of splines—2.7, 8) total mechanical advantage (no friction)—287.7, 9) total mechanical advantage (with friction)—28.8, and 10) required input torque on the nut (with friction)—9.4 Nm.

In some embodiments, a locking feature on nut 164 provides additional security against nut 164 from coming loose. In various embodiments, nut 164 comprises one of the following: a tangential clamp nut, a nylon-insert lock nut, a castellated nut, a pair of jam nuts, a Stover lock nut, a two-way lock nut, a serrated flange lock nut, a K-lock nut, etc. In various embodiments, a separate locking feature is used in combination with nut 164 (e.g., a thread locker compound, a lockwasher, a cotter pin, etc.).

In various embodiments, inner cylinder 152 is a solid cylinder or a hollow cylinder. In various embodiments, a solid or hollow form of inner cylinder 152 is manufactured starting from bar stock (e.g., using a lathe to form the cylindrical shape). In various embodiments, a hollow form of inner cylinder 152 is manufactured by boring an inner region of solid bar stock or by starting with hollow tube stock (e.g., metal tube stock). In some embodiments, threaded region 156 of inner cylinder 152 is added using a lathe, a mill, a die, or by any other appropriate means. In various embodiments, inner cylinder 152, wave splines 154, and/or threaded region 156 are manufactured using a standard live-tooling lathe (e.g., with wave splines 154 milled in with an orthogonal spindle head), or by using a 3-axis mill with 3-dimensional tool pathing. In various embodiments, wave splines 154 are manufactured on a separate hollow cylinder that is attached or fused around a separate inner cylinder (e.g., by welding, heat fusing, shrink fitting, press fitting, or by any other appropriate means) so as to create inner cylinder 152 with the raised structure of wave splines 154 on the surface of inner cylinder 152.

As shown in FIG. 1D, the inner cylinder 152 comprises an upper portion comprising the threaded region 156, a central portion 153, and a lower portion comprising the wave splines 154. An upper axial face 155 of the wave splines 154 is defined by an upper outer edge 155a and an upper inner edge 155b along which the central portion 153 and the wave splines 154 connect. The upper axial face 155 of the wave splines 154 has a uniform radial thickness defined by the radial distance between the upper inner edge 155b and the upper outer edge 155a. The axial length of the lower portion of the inner cylinder 152 varies in an oscillating manner as the inner cylinder rotates about its axis to form a first wave profile corresponding to the curved structures or wave-like shapes of the wave splines 154.

As further shown in FIG. 1D, the outer cylinder 158 comprises an upper portion comprising a flange 160, a central portion 161, and a lower portion comprising the wave splines 162. A lower axial face 163 of the wave splines 162 is defined by a lower outer edge 163a and a lower inner edge 163b. The lower axial face 163 of the wave splines 162 has a uniform radial thickness defined by the radial distance between the lower inner edge 163b and the lower outer edge 163a. The axial length of the lower portion of the outer cylinder 158 varies in an oscillating manner as the outer cylinder rotates about its axis to form a second wave profile corresponding to the curved structures or wave-like shapes of the wave splines 162.

Figure 5A:
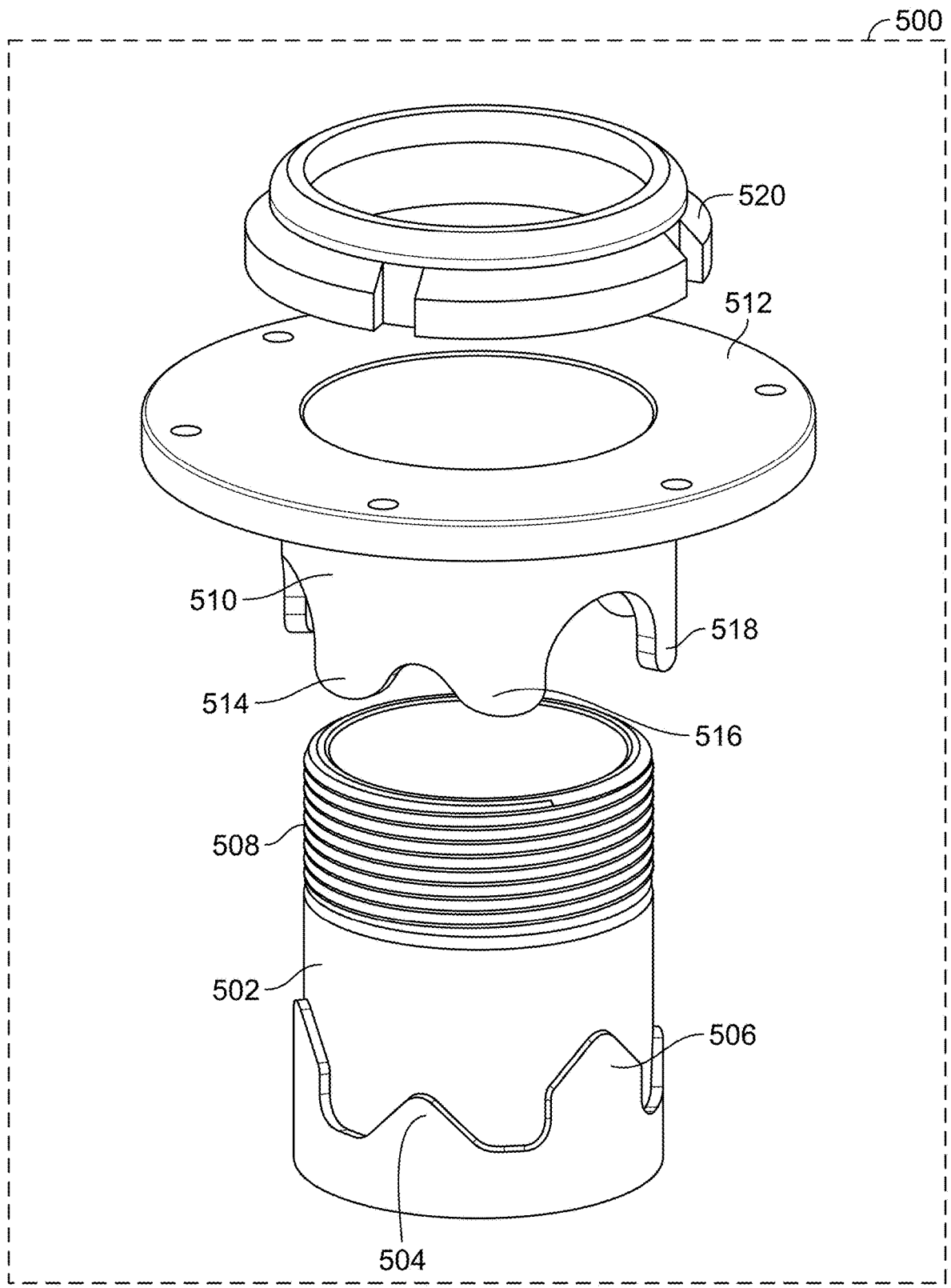
FIG. 5A is a block diagram illustrating an embodiment of a dual-height torque transferring coupler.
Figure 5B:
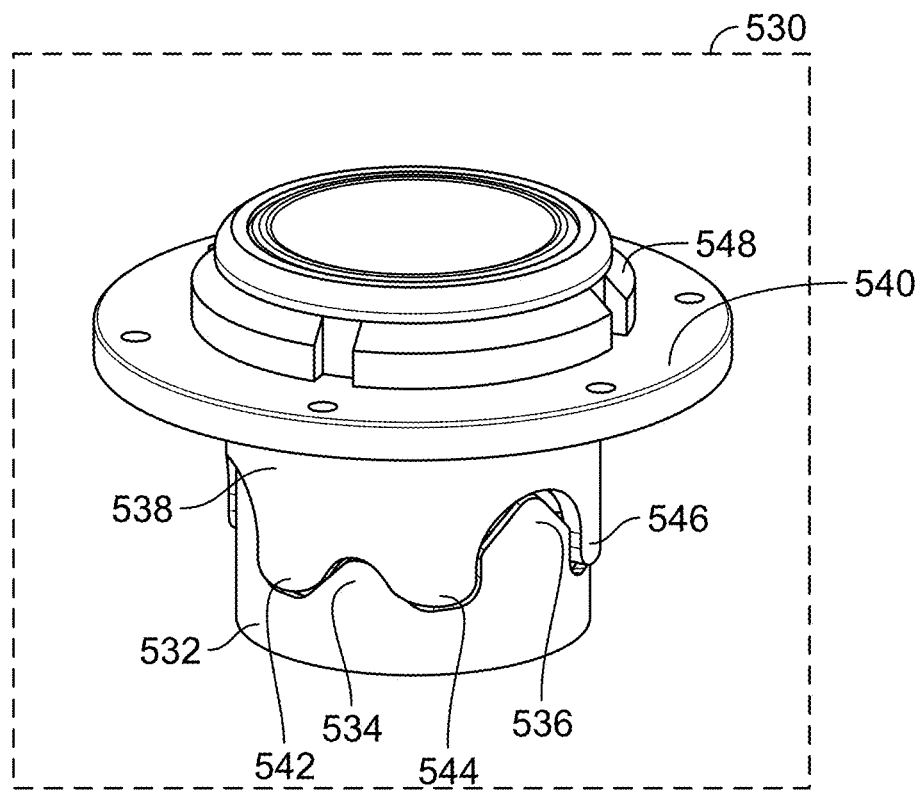
FIG. 5B is a block diagram illustrating an embodiment of a dual-height torque transferring coupler positioned at a first height.

In various embodiments, the first wave profile and the second wave profile have different shapes. The embodiment shown in FIGS. 1A-1C show wave profiles comprising waves having a single frequency and a single amplitude. The embodiments of FIGS. 1D, 1E, 2A, 2B, and 6A-6D show wave profiles comprising horizontal portions and waves having a single amplitude. The embodiments of FIGS. 2C and 2D show wave profiles comprising steep-angled splines having longer periodicities, lower frequencies, and higher amplitudes than the wave splines shown in FIGS. 2A and 2B. The embodiment of FIGS. 5A-5B shows wave profiles having multiple frequencies and multiple amplitudes.

In some embodiments, wave splines 154 have a first wave profile and wave splines 162 have a second wave profile. In some embodiments, wave splines 154 and wave splines 162 interlock with a first point of wave splines 154 contacting a second point of wave splines 162. In some embodiments, wave splines 154 and wave splines 162 interlock with a first section of wave splines 154 contacting a second section of wave splines 162. In some embodiments, wave splines 154 and wave splines 162 interlock with a first line segment of wave splines 154 contacting a second line segment of wave splines 162. In some embodiments, wave splines 154 and wave splines 162 interlock together providing a low backlash coupling.

Figure 1E:
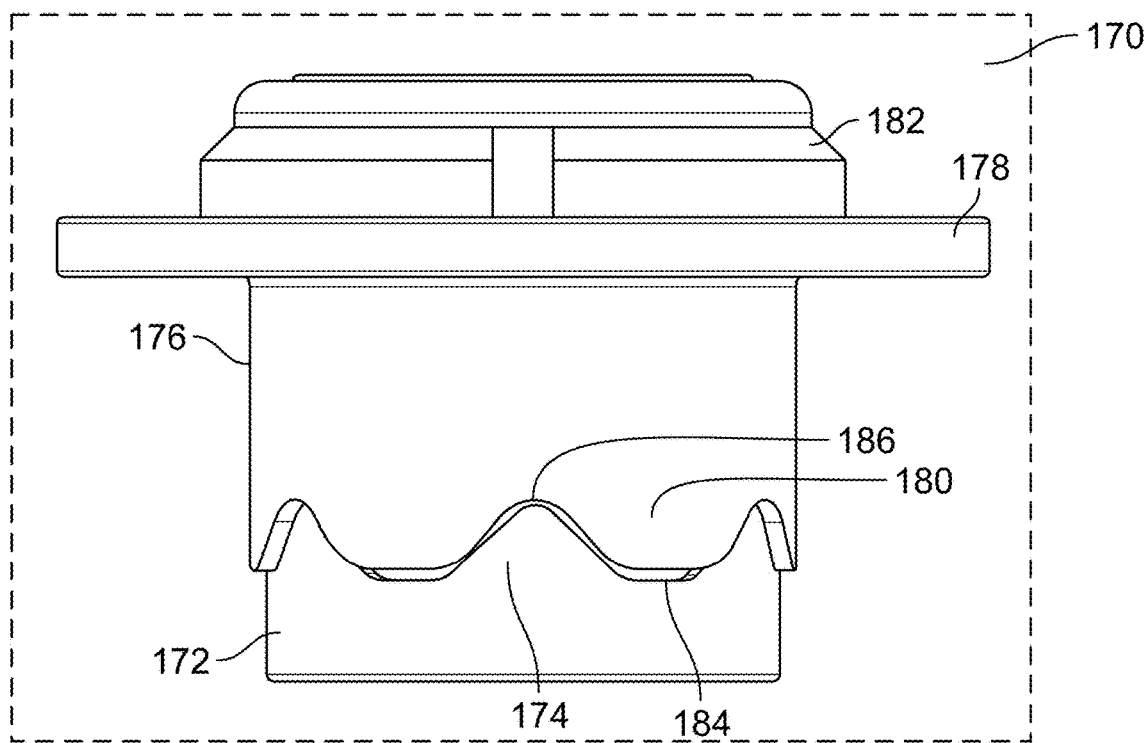
FIG. 1E is a block diagram illustrating a side view of an embodiment of a torque transferring coupler.

FIG. 1E is a block diagram illustrating a side view of an embodiment of a torque transferring coupler. In some embodiments, TTC 170 comprises TTC 150 of FIG. 1D. In the example shown, TTC 170 comprises inner cylinder 172 with wave splines 174, outer cylinder 176 with flange 178 and wave splines 180, and nut 182. In the example shown, wave splines 174 and wave splines 180 are interlocked by having positioned outer cylinder 176 around inner cylinder 172. Nut 182 has been threaded onto a threaded region (not shown) of inner cylinder 172 to secure the coupling.

In the example shown, wave splines 174 are integral to inner cylinder 172 and stand shy of wave splines 180. By making wave splines 174 shy of wave splines 180, inner cylinder 172 maintains a low surface profile (e.g., relative to an integral longer drive shaft), one of the key characteristics of this assembly. In the example shown, wave splines 180 of outer cylinder 176 need to be thicker because there is no cylindrical support material (e.g., to provide radial torque resistance).

In some embodiments, horizontal region 186 and horizontal region 184 of the wave splines 180 and wave splines 174 are not in contact for TTC 170. This enables zero backlash coupling between inner cylinder 172 and outer cylinder 176.

In various embodiments, wave splines 174 of inner cylinder 172 stand proud of wave splines 180 (in an interlocked configuration the outer surface of the wave splines 174 has a larger radius than the outer surface of the wave splines 180), the wave splines 174 of the inner cylinder 172 are flush with wave splines 180 (in an interlocked configuration the outer surface of the wave splines 174 is radially aligned with the outer surface of the wave splines 180), or the wave splines 174 of the inner cylinder 172 stand shy of the wave splines 180 (in an interlocked configuration the outer surface of the wave splines 174 has a smaller radius than the outer surface of the wave splines 180), or any other appropriate relation between wave splines 174 and wave splines 180.

In some embodiments, wave splines 174 and/or and wave splines 180 have a periodicity. In some embodiments, wave splines 174 and/or and wave splines 180 have a single frequency. In some embodiments, wave splines 174 and/or and wave splines 180 each comprise multiple frequencies. In some embodiments, wave splines 174 and/or and wave splines 180 each has a single amplitude. In some embodiments, wave splines 124 and/or and wave splines 130 each comprise multiple amplitudes.

Figure 1F:
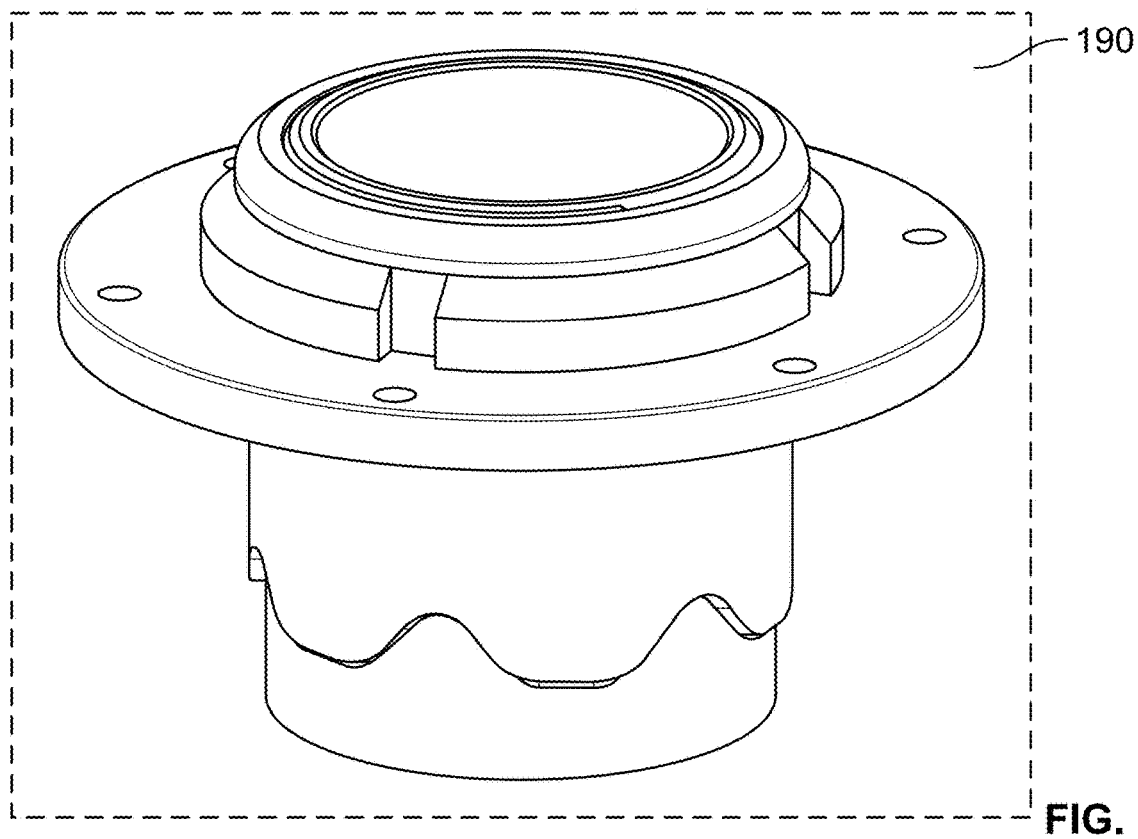
FIG. 1F is a block diagram illustrating a perspective view of an embodiment of a torque transferring coupler.

FIG. 1F is a block diagram illustrating a perspective view of an embodiment of a torque transferring coupler. In some embodiments, TTC 190 comprises TTC 150 of FIG. 1D. In the example shown, TTC 190 is a perspective view of TTC 170 of FIG. 1E.

Figure 2A:
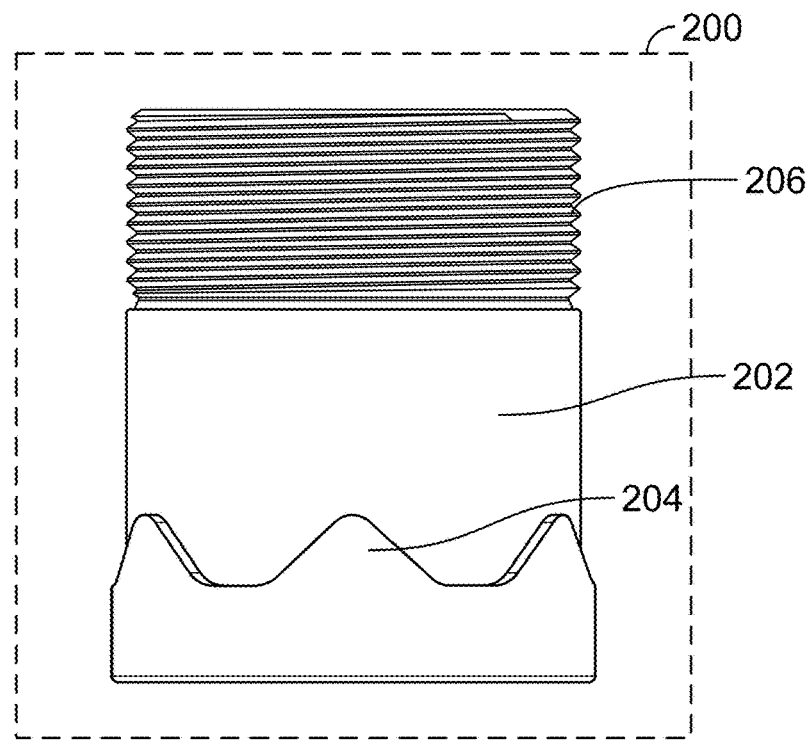
FIG. 2A is a block diagram illustrating a side view of an embodiment of an inner cylinder with shallow-angled splines.

FIG. 2A is a block diagram illustrating a side view of an embodiment of an inner cylinder with shallow-angled splines. In some embodiments, inner cylinder with shallow-angled splines 200 comprises inner cylinder 102, wave splines 104, and threaded region 106 of FIG. 1A. In the example shown, inner cylinder with shallow-angled splines 200 comprises inner cylinder 202, shallow-angled splines 204, and threaded region 206. In the example shown, shallow-angled splines 204 have a longer periodicity, a lower frequency, and a lower amplitude than wave splines 124 shown in FIG. 1B. In some embodiments, shallow-angled splines 204 have a smoothly varying profile (e.g., the profile is wave-like, has no points of discontinuities, no sharp edges, etc.) to allow smooth rotational motion between inner cylinder 202 and an outer cylinder as the two are put together to form a coupling. In various embodiments, shallow-angled splines 204 comprise wave-like splines (i.e., 'wave splines').

In the example shown, shallow-angled splines 204 stand proud of inner cylinder 202 (i.e., shallow-angled splines 204 present a raised surface profile that sticks out from inner cylinder 202, in an interlocked configuration the radius of the outer surface of the shallow-angled splines 204 is larger than the radius of the outer surface of the inner cylinder 202). In some embodiments, typical spline thicknesses are 1-3 mm. In various embodiments, the amount that shallow-angled splines 204 stand proud from inner cylinder 202 (i.e., the thickness of shallow-angled splines 204) is the same or different as the thickness of the splines of an outer cylinder comprising part of a complete TTC device (not shown).

In various embodiments, inner cylinder 202 is a solid cylinder or a hollow cylinder. In various embodiments, a solid or hollow form of inner cylinder 202 is manufactured starting from bar stock (e.g., using a lathe to form the cylindrical shape). In various embodiments, a hollow form of inner cylinder 202 is manufactured by boring an inner region of solid bar stock or by starting with hollow tube stock (e.g., metal tube stock). In some embodiments, the threaded region 206 of inner cylinder 202 is added using a lathe, a mill, a die, or by any other appropriate means. In various embodiments, inner cylinder 202, shallow-angled splines 204, and/or threaded region 206 are manufactured using a standard live-tooling lathe (e.g., with shallow-angled splines 204 milled in with an orthogonal spindle head), or by using a 3-axis mill with 3-dimensional tool pathing. In various embodiments, shallow-angled splines 204 are manufactured on a separate hollow cylinder that is attached or fused around a separate inner cylinder (e.g., by welding, heat fusing, shrink fitting, press fitting, or by any other appropriate means) so as to create inner cylinder 202 with the raised structure of shallow-angled splines 204 on the surface of inner cylinder 202.

In various embodiments, shallow-angled splines 204 are manufactured on a separate hollow cylinder that comprises the same or different material as inner cylinder 202. For example, shallow-angled splines 204 are manufactured from ABS tube stock that is fused around inner cylinder 202, wherein inner cylinder 202 comprises round aluminum bar stock that has been machined on a lathe to add threaded region 206. In some embodiments, shallow-angled splines 204 are designed to interlock with the splines of an outer cylinder comprising part of a complete TTC device (not shown).

Figure 2B:
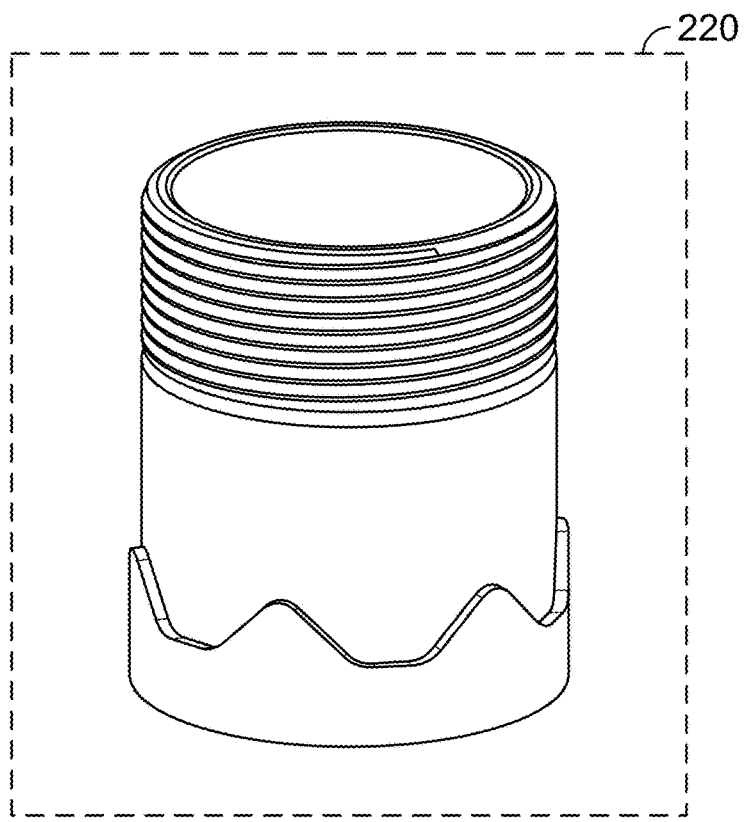
FIG. 2B is a block diagram illustrating a perspective view of an embodiment of an inner cylinder with shallow-angled splines.
Figure 2C:
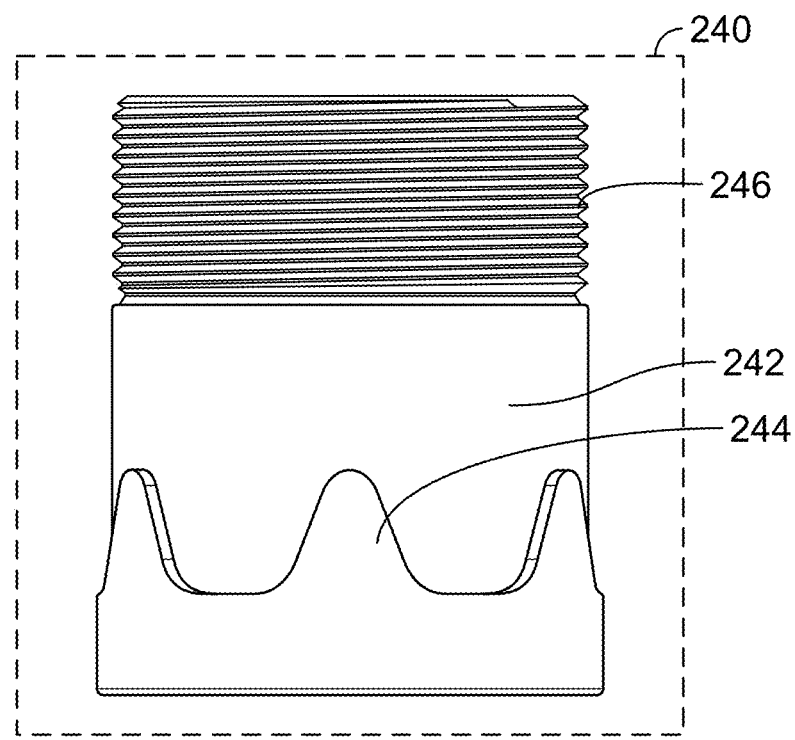
FIG. 2C is a block diagram illustrating a side view of an embodiment of an inner cylinder with steep-angled splines.
Figure 2D:
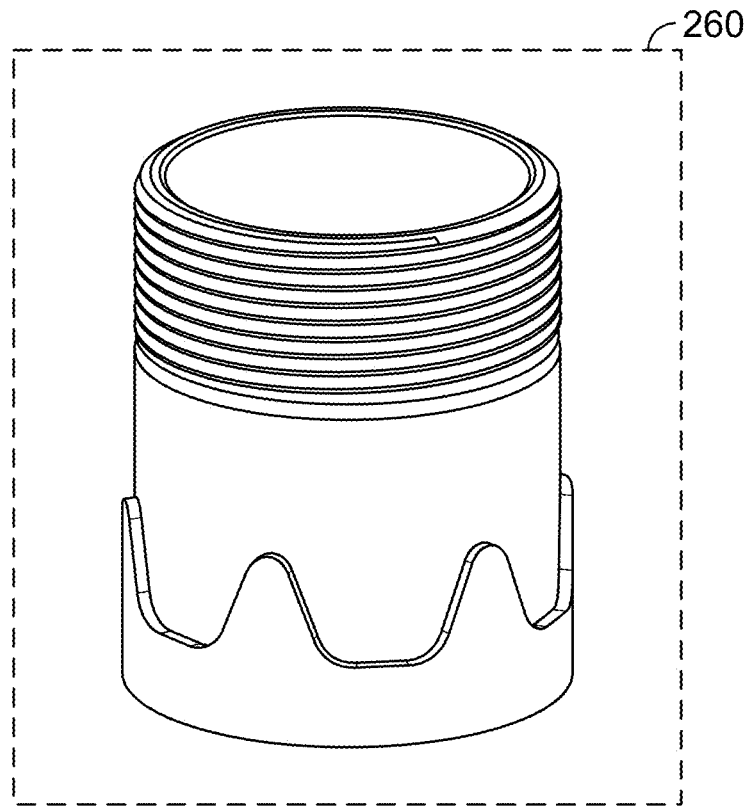
FIG. 2D is a block diagram illustrating a perspective view of an embodiment of an inner cylinder with steep-angled splines.

FIG. 2B is a block diagram illustrating a perspective view of an embodiment of an inner cylinder with shallow-angled splines. In some embodiments, inner cylinder with shallow-angled splines 220 comprises inner cylinder 102, wave splines 104, and threaded region 106 of FIG. 1A. In the example shown, inner cylinder with shallow-angled splines 220 is a perspective view of inner cylinder with shallow-angled splines 200 of FIG. 2A.

FIG. 2C is a block diagram illustrating a side view of an embodiment of an inner cylinder with steep-angled splines. In some embodiments, inner cylinder with steep-angled splines 240 comprises inner cylinder 102, wave splines 104, and threaded region 106 of FIG. 1A. In the example shown, inner cylinder with steep-angled splines 240 comprises inner cylinder 242, steep-angled splines 244, and threaded region 246. In the example shown, steep-angled splines 244 have a longer periodicity, a lower frequency, and a higher amplitude than wave splines 204 shown in FIG. 2A.

In some embodiments, steep-angled splines 244 have a smoothly varying profile (e.g., the profile is wave-like, has no points of discontinuities, no sharp edges, etc.) to allow smooth rotational motion between inner cylinder 242 and an outer cylinder as the two are put together to form a coupler. In various embodiments, steep-angled splines 244 comprise wave-like splines (i.e., 'wave splines').

In the example shown, steep-angled splines 244 stand proud of inner cylinder 242 (i.e., steep-angled splines 244 present a raised surface profile that sticks out from inner cylinder 242, in an interlocked configuration the radius of the outer surface of the shallow-angled splines 244 is larger than the radius of the outer surface of the inner cylinder 242). In various embodiments, the amount that steep-angled splines 244 stand proud from inner cylinder 242 (i.e., the thickness of steep-angled splines 244) is the same as or is different from the thickness of the splines of an outer cylinder comprising part of a complete TTC device (not shown).

In various embodiments, inner cylinder 242 is a solid cylinder or a hollow cylinder. In various embodiments, a solid or hollow form of inner cylinder 242 is manufactured starting from bar stock (e.g., using a lathe to form the cylindrical shape). In various embodiments, a hollow form of inner cylinder 242 is manufactured by boring an inner region of solid bar stock or by starting with hollow tube stock (e.g., metal tube stock). In some embodiments, the threaded region 246 of inner cylinder 242 is added using a lathe, a mill, a die, or by any other appropriate means. In various embodiments, inner cylinder 242, steep-angled splines 244, and/or threaded region 246 are manufactured using a standard live-tooling lathe (e.g., with steep-angled splines 244 milled in with an orthogonal spindle head), or by using a 3-axis mill with 3-dimensional tool pathing. In various embodiments, steep-angled splines 244 are manufactured on a separate hollow cylinder that is attached or fused around a separate inner cylinder (e.g., by welding, heat fusing, shrink fitting, press fitting, or by any other appropriate means) so as to create inner cylinder 242 with the raised structure of steep-angled splines 244 on the surface of inner cylinder 242.

In various embodiments, steep-angled splines 244 are manufactured on a separate hollow cylinder that comprises the same or different material as inner cylinder 242. For example, steep-angled splines 244 are manufactured from ABS tube stock that is fused around inner cylinder 242, wherein inner cylinder 242 comprises round aluminum bar stock that has been machined on a lathe to add threaded region 246. In some embodiments, steep-angled splines 244 are designed to interlock with the splines of an outer cylinder comprising part of a complete TTC device (not shown).

FIG. 2D is a block diagram illustrating a perspective view of an embodiment of an inner cylinder with steep-angled splines. In some embodiments, inner cylinder with steep-angled splines 260 comprises inner cylinder 102, wave splines 104, and threaded region 106 of FIG. 1A. In the example shown, inner cylinder with steep-angled splines 260 is a perspective view of inner cylinder with steep-angled splines 240 of FIG. 2C.

Figure 3A:
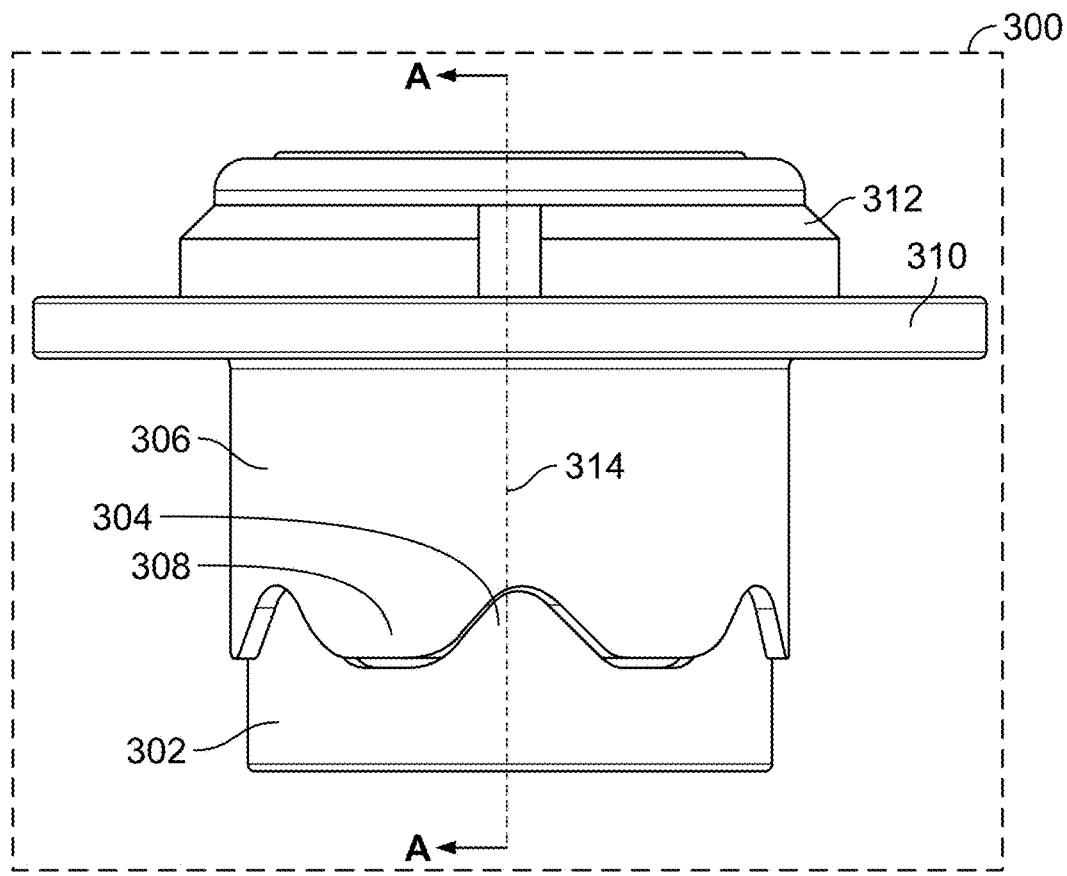
FIG. 3A is a block diagram illustrating a side view of an embodiment of a torque transferring coupler.

FIG. 3A is a block diagram illustrating a side view of an embodiment of a torque transferring coupler. In some embodiments, TTC 300 comprises TTC 100 of FIG. 1A. In the example shown, TTC 300 comprises inner cylinder 302 with wave splines 304, outer cylinder 306 with wave splines 308 and flange 310, and nut 312. In the example shown, wave splines 304 and wave splines 308 are interlocked by having positioned outer cylinder 306 around inner cylinder 302. Wave splines 304 and wave splines 308 do not have any sharp points or discontinuities so that when inner cylinder 302 is rotated against outer cylinder 306 it can be smoothly set to a position enabling torque transfer when coupled. Nut 312 has been threaded onto a threaded region (not shown) of inner cylinder 302 to secure the coupling. In the example shown, wave splines 304 and wave splines 308 illustrate another embodiment of wave spline profiles as compared to the wave spline profiles shown in FIGS. 1A, 2A, and 2C. Line 314 (labeled with A's on either end) indicates the plane of a cross-sectional view of TTC 300 that is revealed in FIG. 3B.

Figure 3B:
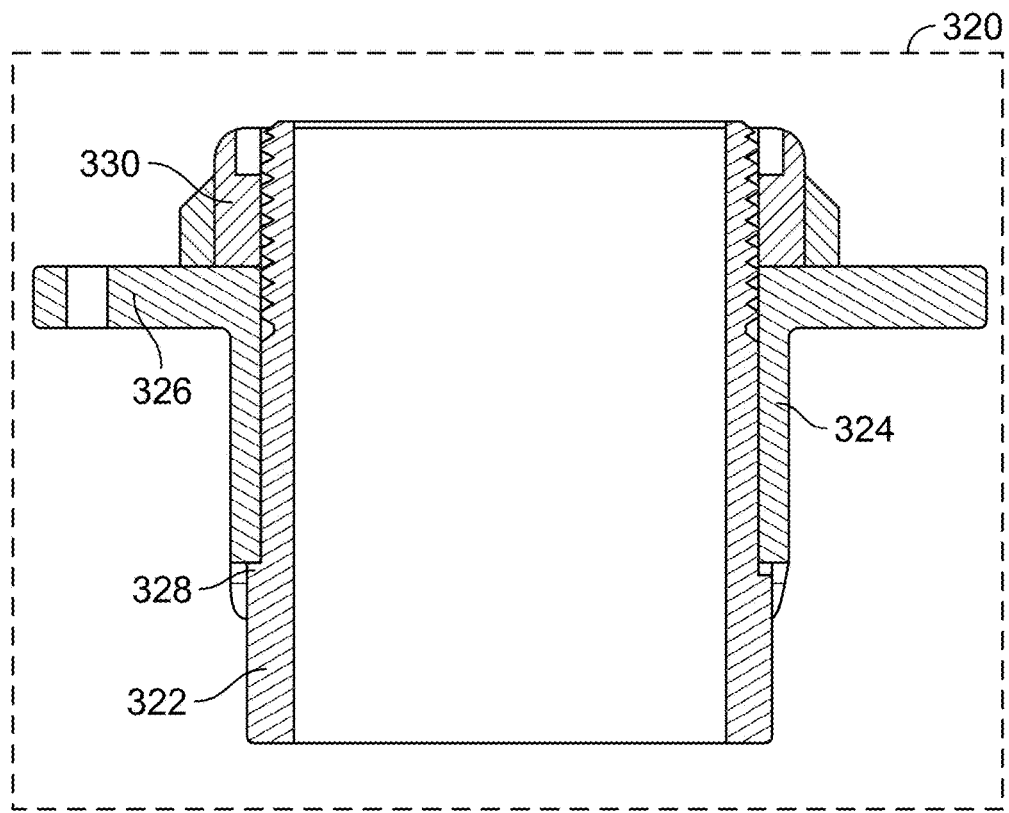
FIG. 3B is a block diagram illustrating a cross-sectional view of an embodiment of a torque transferring coupler.

FIG. 3B is a block diagram illustrating a cross-sectional view of an embodiment of a torque transferring coupler. In some embodiments, TTC 320 comprises TTC 100 of FIG. 1A. In the example shown, TTC 320 is a cross-sectional view of TTC 300 corresponding to line 314 (labeled with A's on either end) of FIG. 3A. In the example shown, TTC 320 comprises inner cylinder 322, outer cylinder 324 with flange 326, and nut 330. Lip 328 provides torque resistance to the axial force applied to flange 326 when securing the coupling via nut 330.

Figure 4A:
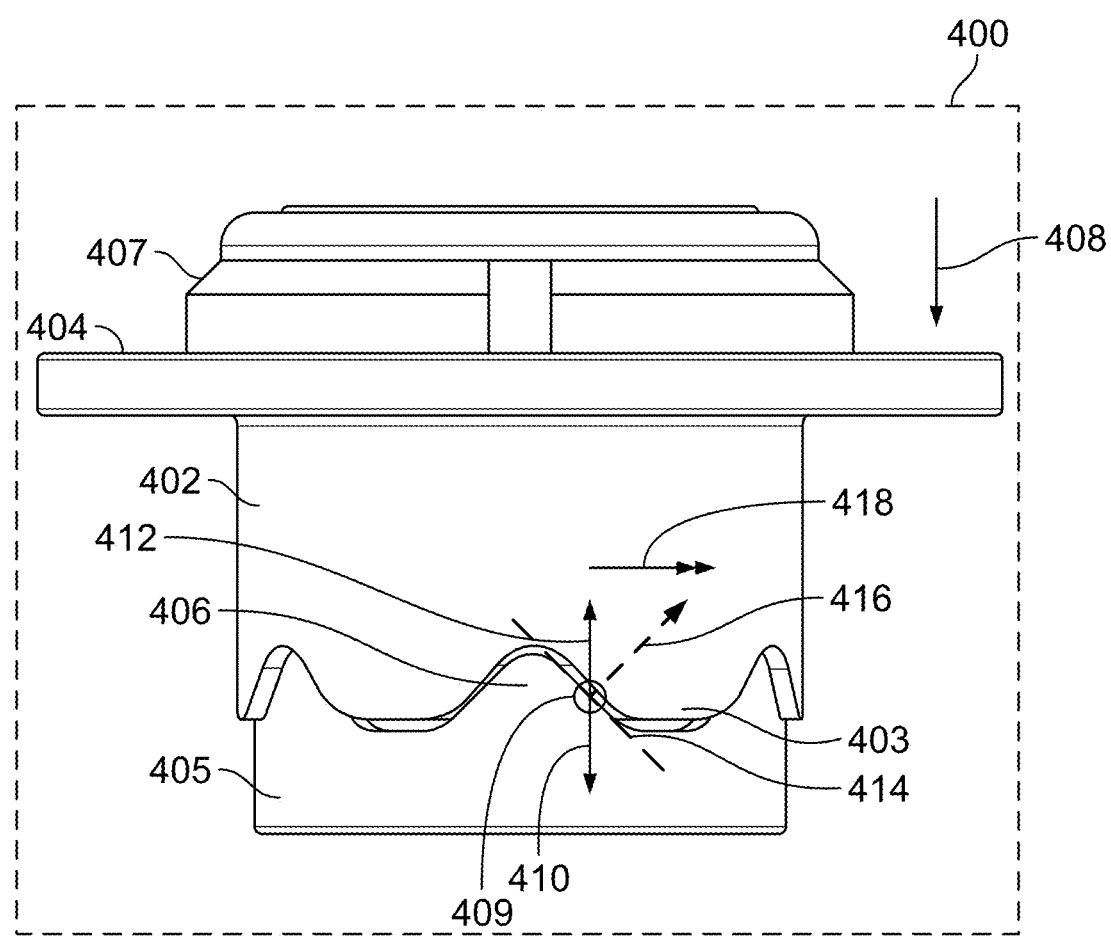
FIG. 4A is a block diagram illustrating applied and reactive forces in an embodiment of a torque transferring coupler with shallow-angled splines.

FIG. 4A is a block diagram illustrating applied and reactive forces in an embodiment of a torque transferring coupler with shallow-angled splines. In some embodiments, TTC 400 comprises TTC 100 of FIG. 1A. In the example shown, TTC 400 comprises outer cylinder 402 with wave splines 403 and flange 404, inner cylinder 405 with shallow-angled splines 406, and nut 407. In the example shown, arrow 408 indicates the axial force applied by nut 407 onto flange 404. Arrow 410 indicates the axial force transferred by flange 404 onto point of contact 409 between wave splines 403 and shallow-angled splines 406. Arrow 412 indicates the reactive force to the axial force applied to point of contact 409 (i.e., the axial force applied as indicated by arrow 410). Line 414 is shown at the angle of contact between wave splines 403 and wave splines 406. Arrow 416 indicates the normal force perpendicular to line 414. Arrow 418 indicates the torque resistant force provided by TTC 400 when nut 407 has secured the coupling. Resistance to rotation between inner cylinder 405 and outer cylinder 402 is not solely dependent on friction or locking of nut 407 against flange 404. Instead, the structures of wave splines 403 and wave splines 406, in conjunction with the axial force, enable resistance to relative rotation between inner cylinder 405 and outer cylinder 402. In the example shown, the limited points of contact between wave splines 403 and wave splines 406 results in precise axial positioning of flange 404 of outer cylinder 402 with respect to inner cylinder 405.

Note that the wave spline structures (e.g., wave splines 403 and wave splines 406) enable resistance to relative rotation in both rotational directions and can thereby enable a zero-backlash coupling between an inner cylinder and an outer cylinder (e.g., inner cylinder 405 and outer cylinder 402). In other words, since there is no contact on the horizontal spline surfaces shown here, there is guaranteed contact on the sloped portions of spline surfaces, which is what provides the zero-backlash, torque resistance.

Figure 4B:
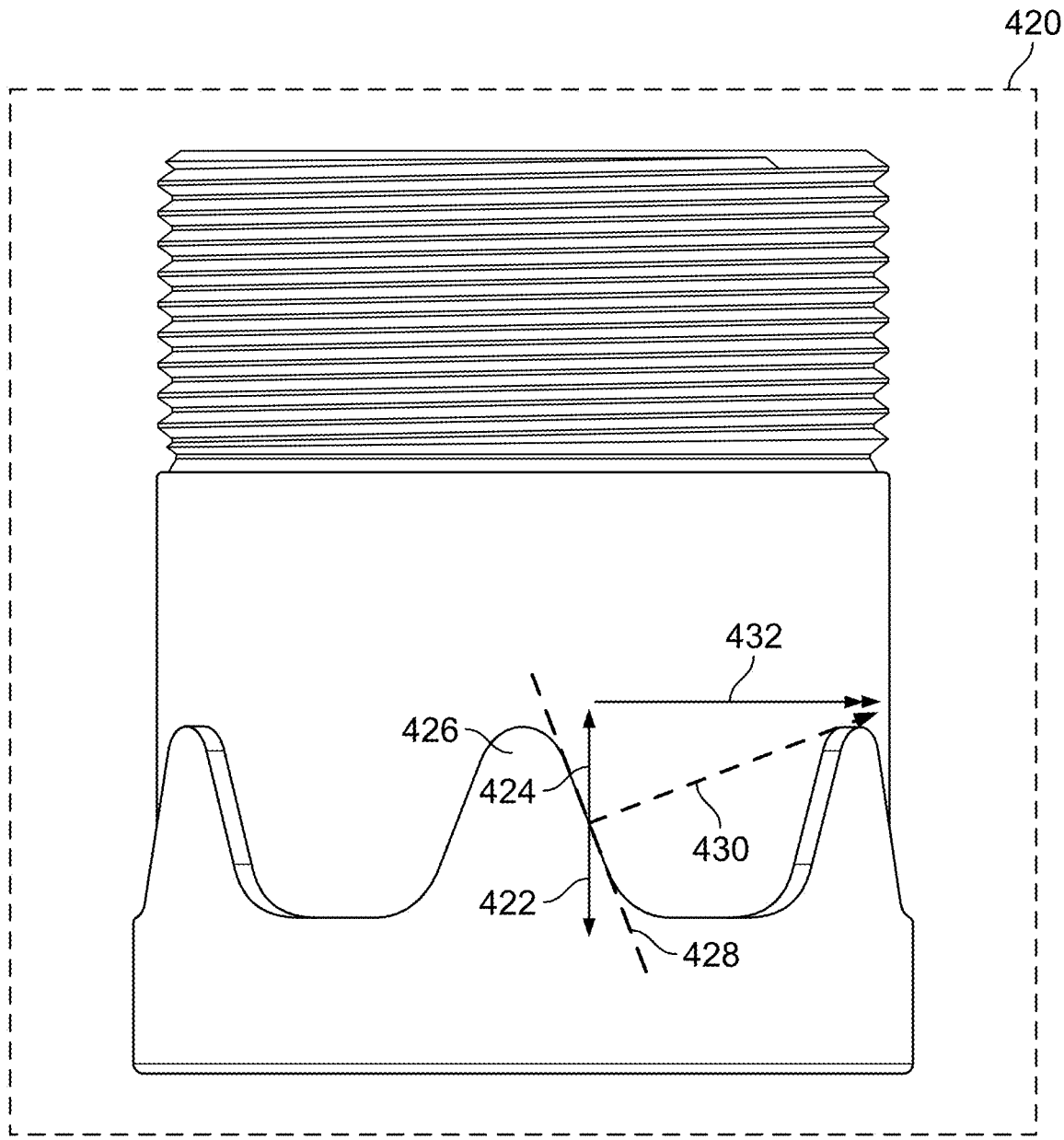
FIG. 4B is a block diagram illustrating applied and reactive forces in an embodiment of an inner cylinder with steep-angled splines of a TTC.

FIG. 4B is a block diagram illustrating applied and reactive forces in an embodiment of an inner cylinder with steep-angled splines of a TTC. In some embodiments, portion of TTC 420 comprises an inner cylinder, wave splines 426, and threaded region. In the example shown, arrow 422 indicates the axial force applied to wave spline 426 (e.g., the axial force applied by a nut and transferred via a flange of an outer cylinder). Arrow 424 indicates the reactive force to the applied axial force (i.e., the axial force applied as indicated by arrow 422). Line 428 is shown at the angle of wave spline 426. Arrow 430 indicates the normal force perpendicular to line 428. Arrow 432 indicates the torque resistant force provided by portion of TTC 420 (e.g., when an outer cylinder with matching wave splines has been installed and secured around inner cylinder with steep-angled splines of portion of TTC 420). Note for the same axial force applied, as indicated by arrow 422, the torque resistant force 432 provided by wave splines 426 is much larger in comparison to the torque resistant force 418 provided by the shallow-angled splines 412 of FIG. 4A.

In the example shown, the steep angle of the splines, as shown by line 428, provides a mechanical advantage, similar to the properties of a wedge. For example, for a steep-angled log-splitting wedge, only a small input force from a hammer is needed to split the wood, because the angle of the wedge magnifies the outward force on the wood. Steeper angles result in a higher outward force multiplier. Relating that principle to the steep-angled splines shown in FIG. 4B, applying too much torque to a nut used to secure an outer cylinder with matching wave splines around inner cylinder with steep-angled splines, would increase the force experienced at the contact interface, as indicated by arrow 422, so much that it could yield the material just during install. So, for a portion of TTC 420, less install torque is required on the nut. That is, a nut installed at low torque (so the material is not close to yielding) can provide a large amount of radial torque resistance due to the large contact surface area provided by a portion of TTC 420. For a given radial torque, higher contact surface area means less stress in the material. In various embodiments, the angles of the wave splines can be tuned depending on the torque requirements of a given application.

Figure 4C:
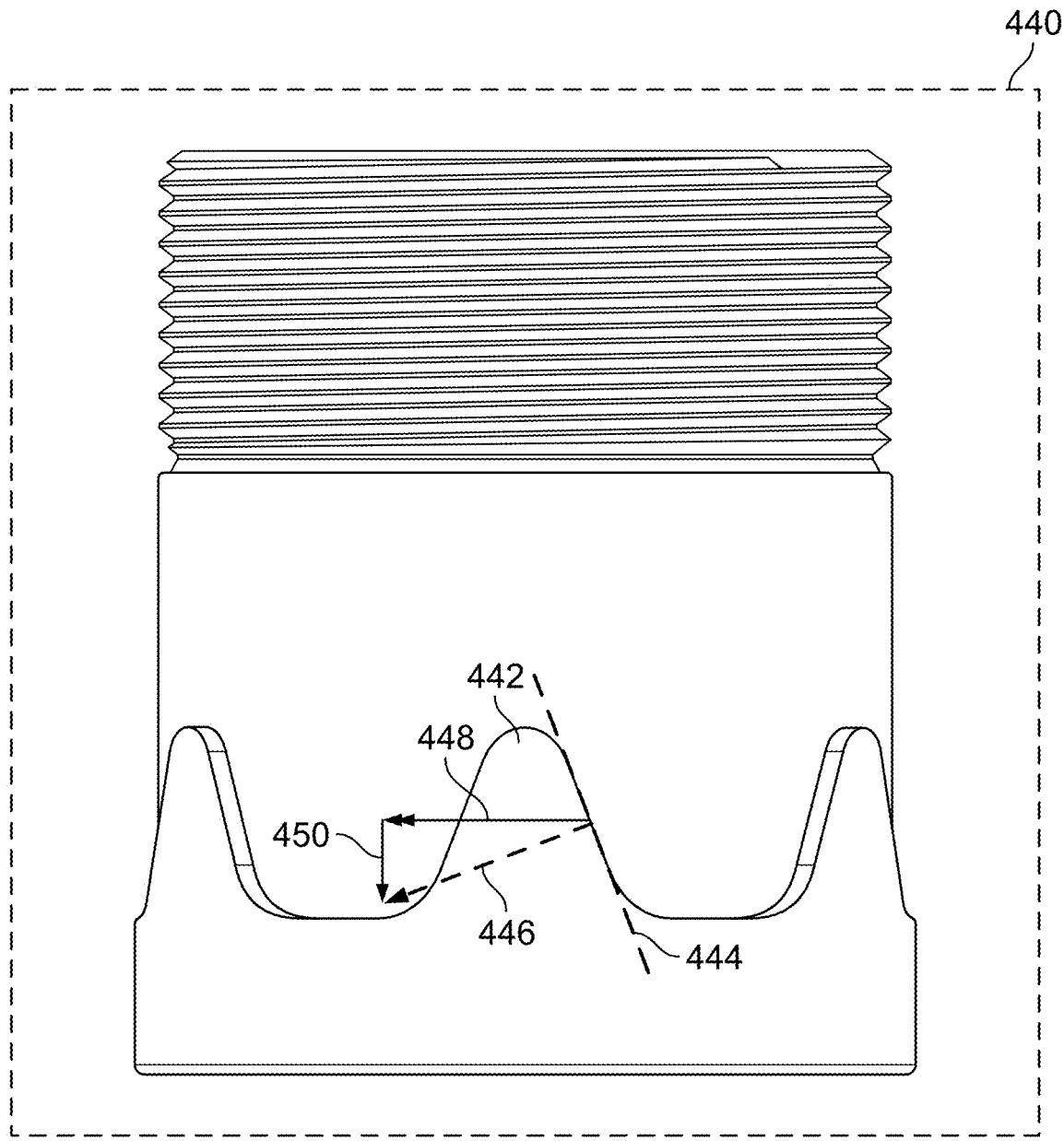
FIG. 4C is a block diagram illustrating forces applied to an embodiment of an inner cylinder with steep-angled splines.

FIG. 4C is a block diagram illustrating forces applied to an embodiment of an inner cylinder with steep-angled splines of a TTC. In some embodiments, portion of TTC 440 comprises an inner cylinder, wave splines 442, and a threaded region. In the example shown, line 444 is shown at the angle of wave splines 442. Arrow 446 indicates the normal force perpendicular to line 444. Arrow 448 indicates the radial force applied to wave spline 442 from a torque transfer—for example, when portion of TTC 440 is used as part of a complete TTC that is installed and used in a torque transferring operation (e.g., when driving a driven shaft, wheel, pulley, gear, etc.). Arrow 450 indicates the axial force at the contact interface resultant from the radial force applied to wave splines 442 from a torque transfer. That is, the steeper the splines, the closer to "perpendicular to the direction of torque transfer" they are, which reduces the amount of force experienced at the wave spline contact interface. Also with steeper wave splines, the magnitude of the forces indicated by arrow 446 and arrow 448 become closer to each other, which is favorable for high torque applications, in that most of the reacted normal force is contributing to the useful torque transfer to the load.

In some embodiments, the steepness of the splines compared to the shallowness of the splines may add more uncertainty to the relative axial position of the inner cylinder to the outer cylinder as the seated position of the inner cylinder wave splines to the outer cylinder wave splines may have more uncertainty with a steeper slope.

In some embodiments, the inner cylinder wave splines have different amplitudes compared to the outer cylinder wave splines so that the splines do not bottom out when securely seated with respect to each other.

FIG. 5A is a block diagram illustrating an embodiment of a dual-height torque transferring coupler. In some embodiments, TTC 500 comprises TTC 100 of FIG. 1A. In the example shown, torque transferring coupler (TTC) 500 comprises inner cylinder 502, outer cylinder 510, and nut 520. In some embodiments, nut 520 couples to inner cylinder 502 (e.g., by being threaded onto threaded region 508). Inner cylinder 502 comprises splines 504 of a first height, splines 506 of a second height, and threaded region 508. Outer cylinder 510 comprises flange 512 and multiple splines that mesh with the splines of inner cylinder 502 (e.g., spline 514, spline 516, and spline 518). In various embodiments, flange 512 is used to couple TTC 500 to a driven shaft, a pulley, a gear, a flange, a wheel, etc.

Spline 514 and spline 516 of outer cylinder 510 are disposed to interlock with either splines 504 or splines 506 of inner cylinder 502. In the example of spline 514 and spline 516 interlocking with splines 504, flange 512 of outer cylinder 510 is disposed axially at a first height. In the example of spline 514 and spline 516 interlocking with splines 506, flange 512 of outer cylinder 510 is disposed axially at a second height. Once splines 504 and splines 506 are interlocked (e.g., by positioning outer cylinder 510 around inner cylinder 502), nut 520 is used to secure the coupling by being threaded onto threaded region 508.

In various embodiments, the splines are designed to create one or more axial offsets—for example, two axial coupling positions, three axial coupling positions, four axial coupling positions, or any other appropriate number of axial coupling positions.

In some embodiments, splines 504, splines 506, and splines 514, splines 516 are smooth and do not have any sharp discontinuities so that outer cylinder 510 and inner cylinder 502 can rotate smoothly with respect to one another to enable simple relative positioning between inner cylinder 502 and outer cylinder 510.

FIG. 5B is a block diagram illustrating an embodiment of a dual-height torque transferring coupler positioned at a first height. In some embodiments, TTC 530 comprises TTC 100 of FIG. 1A. In the example shown, TTC 530 comprises inner cylinder 532, outer cylinder 538, and nut 548. In some embodiments, nut 548 couples to inner cylinder 532 (e.g., by being threaded onto a threaded region of inner cylinder 532). Inner cylinder 532 comprises splines 534 of a first height, splines 536 of a second height. Outer cylinder 538 comprises flange 540 and multiple splines that mesh with the splines of inner cylinder 532 (e.g., spline 542, spline 544, and spline 546). In various embodiments, flange 540 is used to couple TTC 530 to a driven shaft, a pulley, a gear, a flange, a wheel, etc.

In the example shown, spline 542 and spline 544 are interlocked with splines 534, while spline 544 and spline 546 are interlocked with splines 536, thereby positioning flange 540 axially at a first height. Nut 548 has secured the coupling by being threaded onto a threaded region of inner cylinder 532 (not shown).

Figure 5C:
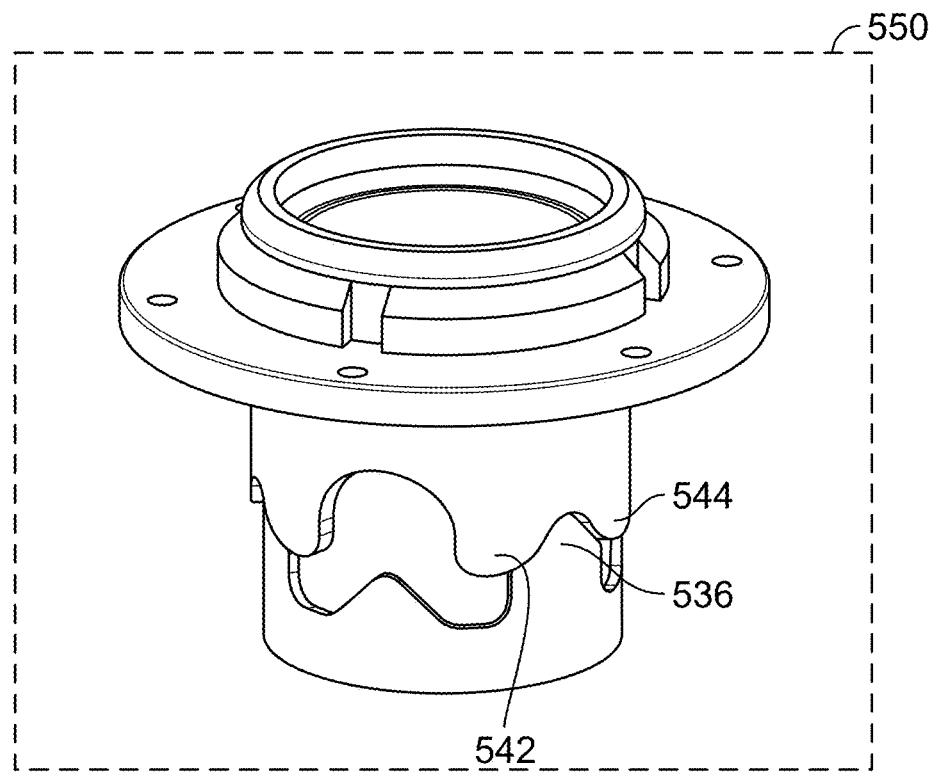
FIG. 5C is a block diagram illustrating an embodiment of a dual-height torque transferring coupler positioned at a second height.

FIG. 5C is a block diagram illustrating an embodiment of a dual-height torque transferring coupler positioned at a second height. In some embodiments, TTC 550 comprises TTC 100 of FIG. 1A. In the example shown, TTC 550 comprises TTC 530 of FIG. 5B, wherein spline 542 and spline 544 are interlocked with splines 536, thereby positioning flange axially at a second height.

Figure 5D:
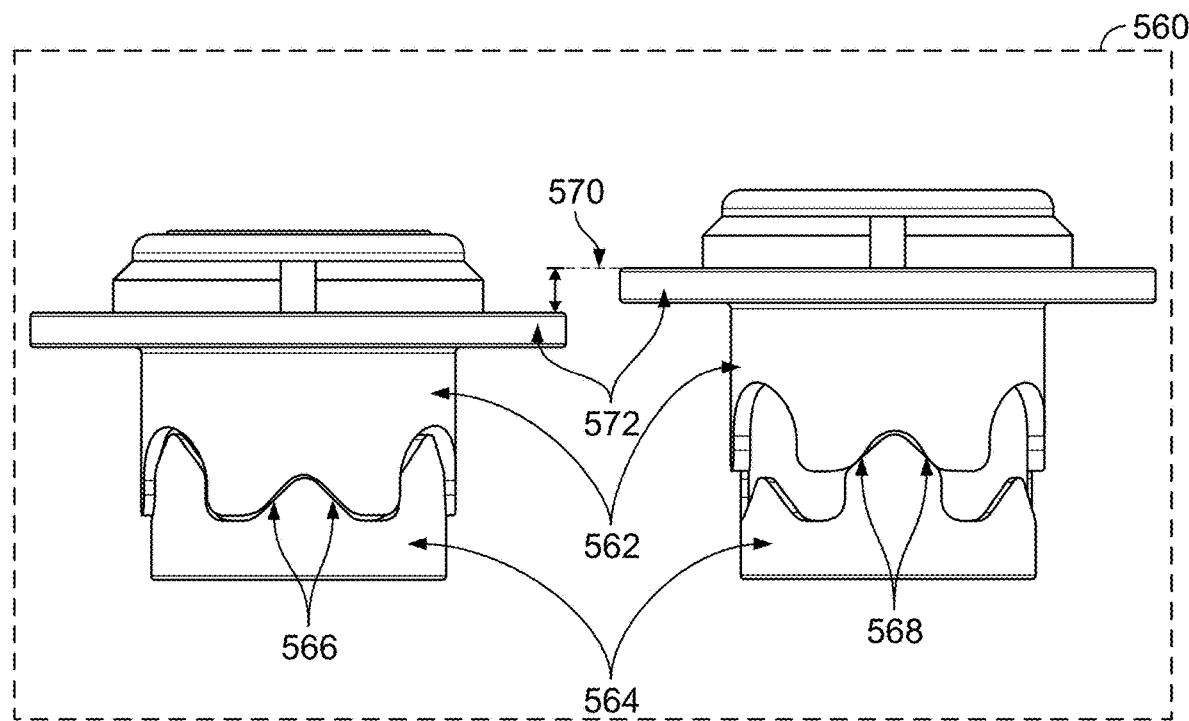
FIG. 5D is a block diagram illustrating points of contact in an embodiment of a dual-height torque transferring coupler positioned at a first and second height.

FIG. 5D is a block diagram illustrating points of contact in an embodiment of a dual-height torque transferring coupler positioned at a first and second height. In some embodiments, TTC 560 comprises TTC 100 of FIG. 1A. In the example shown, outer cylinder 562 is shown positioned relative to inner cylinder 564 at a first height (i.e., a first axial position) via spline points-of-contact 566, and outer cylinder 562 is shown positioned relative to inner cylinder 564 at a second height (i.e., a second axial position) via spline points-of-contact 568. The two different spline points-of-contact 566 and 568 enable a height differential 570 for flange 572 (i.e., flange 572 can be positioned in either of two different axial positions separated by height differential 570).

Figure 5E:
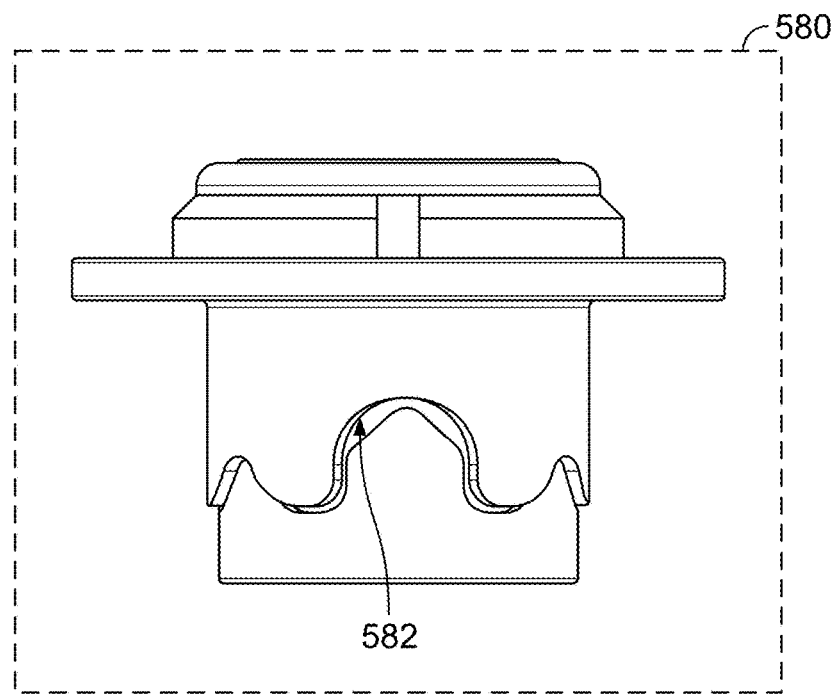
FIG. 5E is a block diagram illustrating the clearance within an embodiment of a dual-height torque transferring coupler positioned at a first height.

FIG. 5E is a block diagram illustrating the clearance within an embodiment of a dual-height torque transferring coupler positioned at a first height. In some embodiments, TTC 580 comprises TTC 100 of FIG. 1A. In the example shown, TTC 580 comprises TTC 560 of FIG. 5D. Clearance 582 is what guarantees contact at the sloped portions of the spline surfaces (i.e., at spline points-of-contact 562), and thus provides zero-backlash, torque resistance for the first axial position of TTC 560 of FIG. 5D.

Figure 6B:
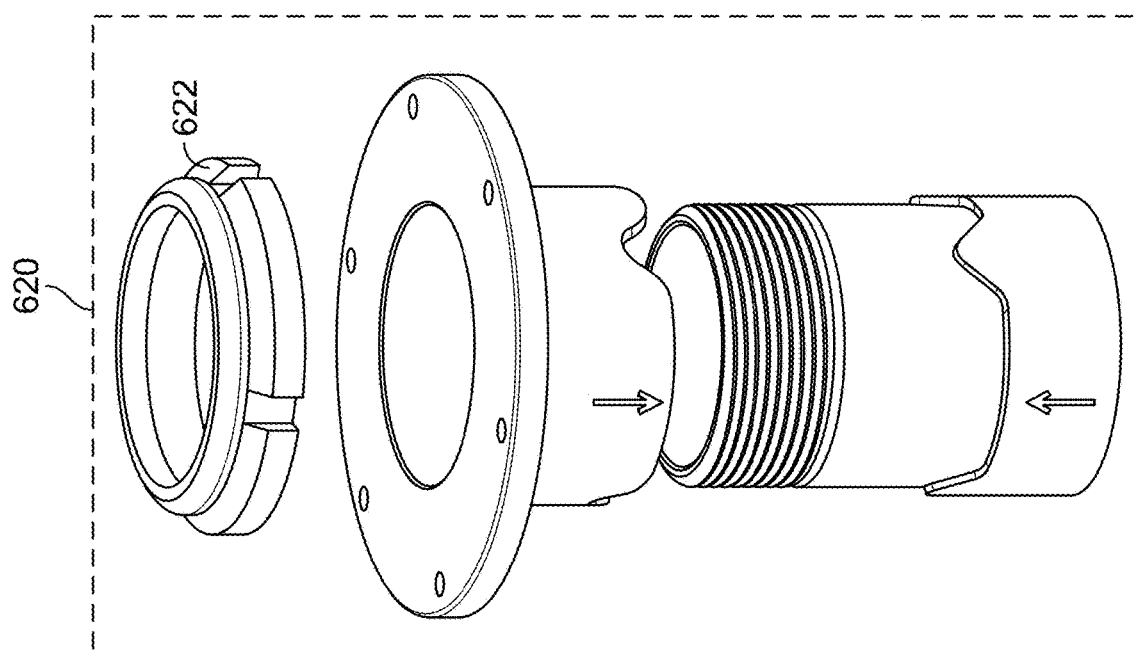
FIG. 6B is a block diagram illustrating a perspective view of an embodiment of a mistake-proof torque transferring coupler.
Figure 6A:
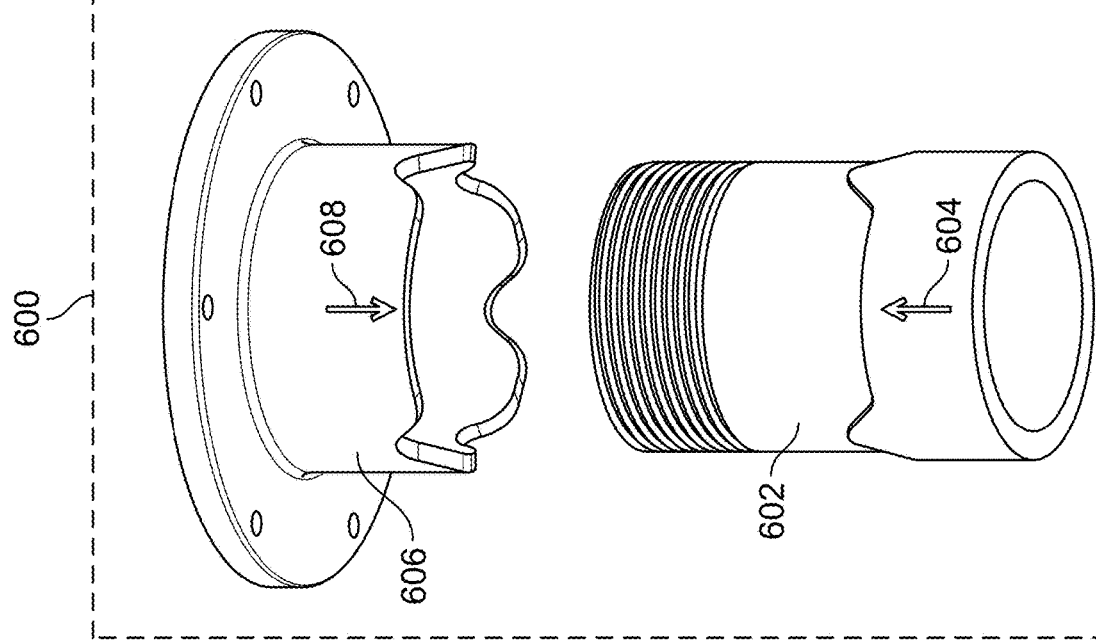
FIG. 6A is a block diagram illustrating an embodiment of a mistake-proof torque transferring coupler.

FIG. 6A is a block diagram illustrating an embodiment of a mistake-proof torque transferring coupler. In some embodiments, TTC 600 comprises TTC 100 of FIG. 1A. In the example shown, TTC 600 comprises outer cylinder with splines 606 and inner cylinder with splines 602. In the example shown, positioning arrow 604 and positioning arrow 608 illustrate proper radial alignment of outer cylinder with splines 606 and inner cylinder with splines 602 prior to securing the coupling (i.e., proper radial alignment is achieved when the arrow ends of positioning arrow 604 and positioning arrow 608 are aligned).

In some embodiments, positioning arrow 604 and positioning arrow 608 are physically marked (e.g., embossed, debossed, painted, etc.) on outer cylinder with splines 606 and inner cylinder with splines 602 (e.g., to provide visual positioning information to a coupling assembler). In some embodiments, there are no positioning arrows marked on outer cylinder with splines 606 and inner cylinder with splines 602.

In the example shown, positioning arrow 604 and positioning arrow 608 are shown for illustration purposes and are not required to achieve proper radial alignment of outer cylinder with splines 606 and inner cylinder with splines 602. This is due to the mistake-proof spline design of TTC 600, wherein there is only one way to physically position outer cylinder with splines 606 and inner cylinder with splines 602 when assembling and securing the coupling. In the example shown, this is achieved by creating one long horizontal spline (as indicated by positioning arrow 608) whereas the other splines of outer cylinder with splines 606 are part of an otherwise continuous wave profile. In various embodiments, a mistake-proof TTC can be implemented by using any other appropriate spline design that provides a break in an otherwise symmetric spline profile.

FIG. 6B is a block diagram illustrating a perspective view of an embodiment of a mistake-proof torque transferring coupler. In some embodiments, TTC 620 comprises TTC 100 of FIG. 1A. In the example shown, TTC 620 comprises TTC 600 of FIG. 6A, but because of the perspective view of TTC 620, nut 622 (not shown in FIG. 6A) is revealed. In some embodiments, nut 620 is used to secure TTC 600 (i.e., nut 620 is used to secure outer cylinder with splines 606 of FIG. 6A to inner cylinder with splines 602 of FIG. 6A).

Figure 6C:
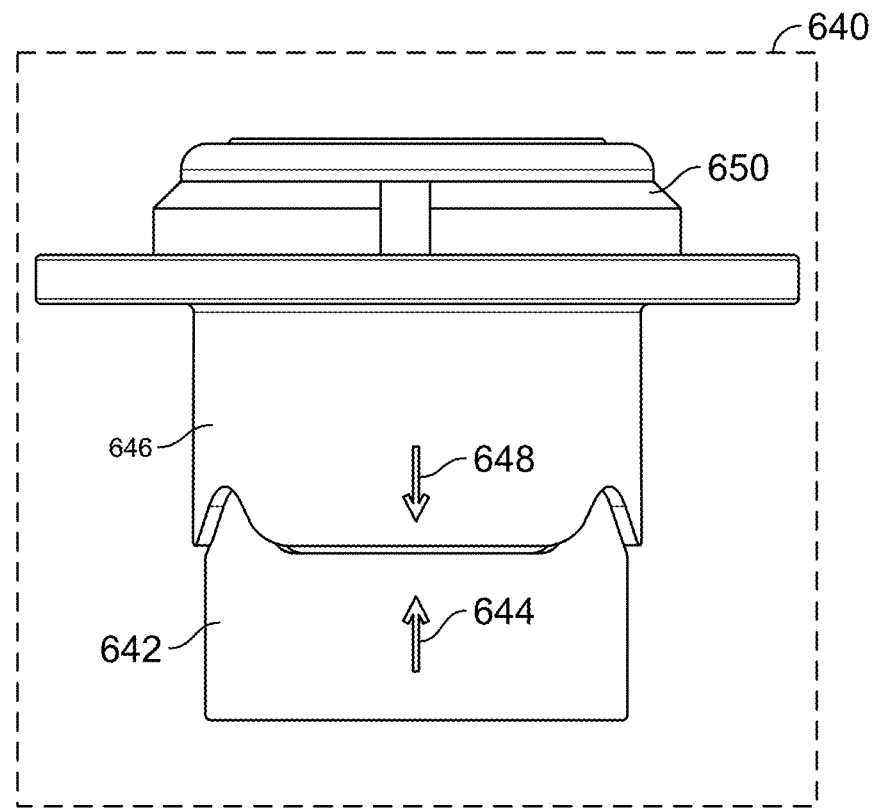
FIG. 6C is a block diagram illustrating a side view of an embodiment of a mistake-proof torque transferring coupler in the coupled position.

FIG. 6C is a block diagram illustrating a side view of an embodiment of a mistake-proof torque transferring coupler in the coupled position. In some embodiments, TTC 620 comprises TTC 100 of FIG. 1A. In the example shown, TTC 640 comprises TTC 600 of FIG. 6A. In the example shown, TTC 640 comprises outer cylinder with splines 646 and inner cylinder with splines 642. The alignment of positioning arrow 644 and positioning arrow 648 illustrates that proper radial alignment of outer cylinder with splines 646 and inner cylinder with splines 642 has been achieved. Nut 650 is shown having secured TTC 640 (i.e., outer cylinder with splines 646 has been coupled to inner cylinder with splines 642).

Figure 6D:
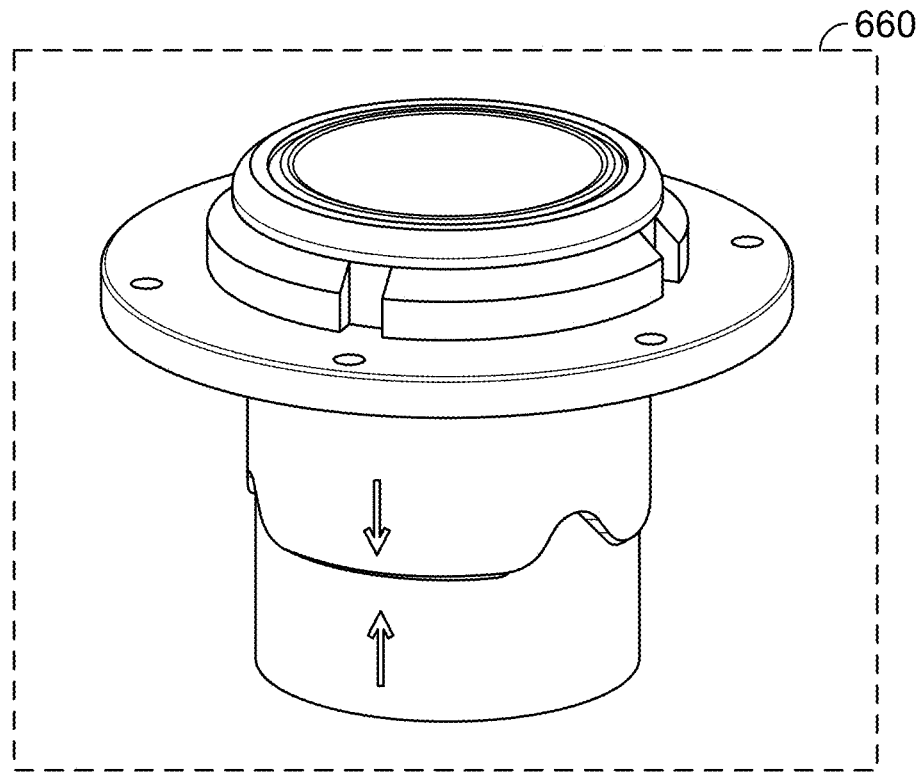
FIG. 6D is a block diagram illustrating a perspective view of an embodiment of a mistake-proof torque transferring coupler in the coupled position.

FIG. 6D is a block diagram illustrating a perspective view of an embodiment of a mistake-proof torque transferring coupler in the coupled position. In some embodiments, TTC 660 comprises TTC 100 of FIG. 1A. In the example shown, TTC 660 comprises TTC 640 of FIG. 6C shown in a perspective view.

Figure 7A:
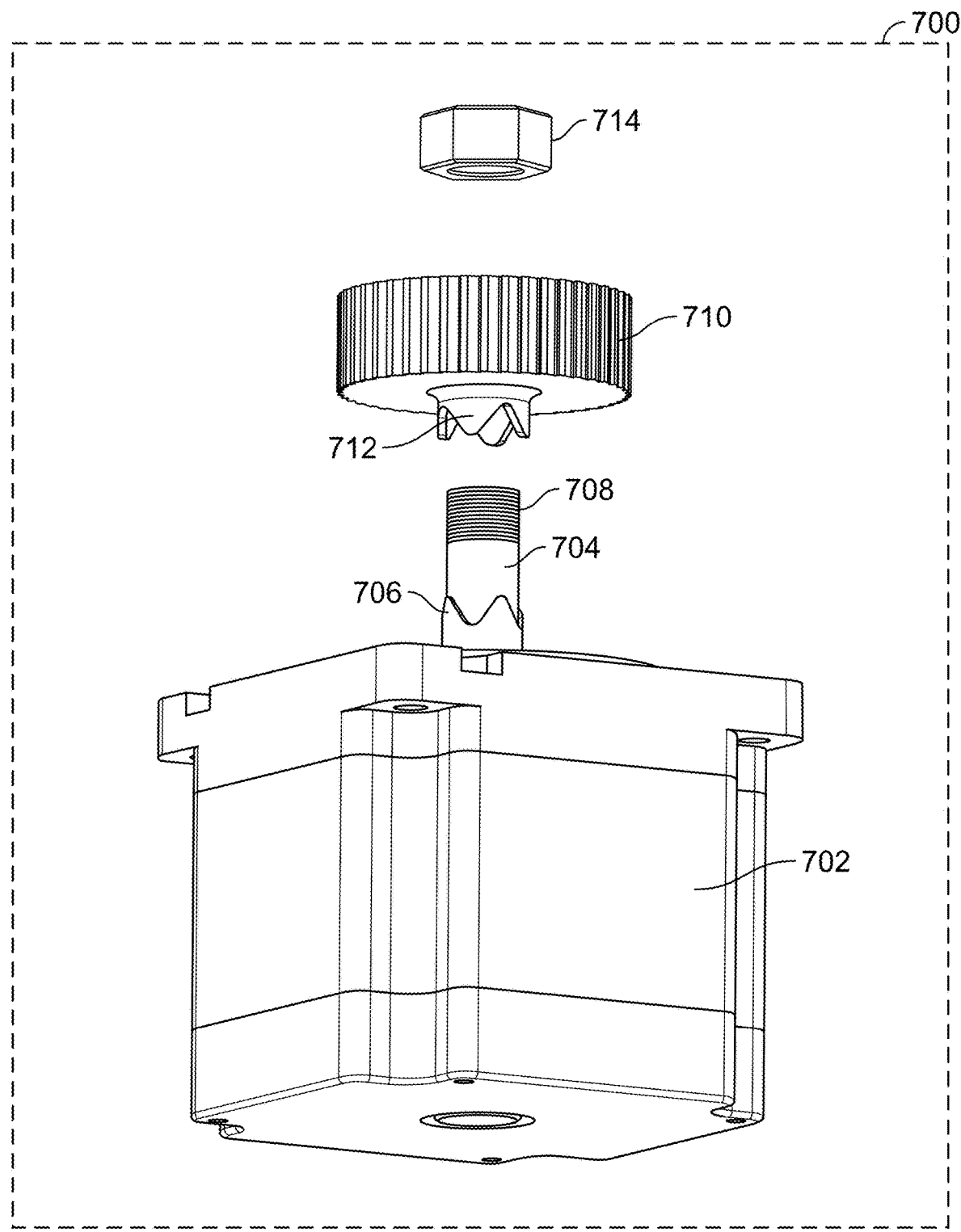
FIG. 7A is a block diagram illustrating an embodiment of a torque transferring coupler as part of a stepper motor assembly.

FIG. 7A is a block diagram illustrating an embodiment of a torque transferring coupler as part of a stepper motor assembly. In the example shown, the stepper motor with gear assembly 700 comprises stepper motor 702, drive shaft 704, wave splines 706, threaded region 708, gear 710, outer cylinder with wave splines 712, and nut 714. In some embodiments, drive shaft 704 with wave splines 706 and threaded region 708, along with outer cylinder with wave splines 712 and nut 714, comprise TTC 100 of FIG. 1A, wherein flange 110 of FIG. 1A has been replaced by gear 710. In some embodiments, gear 710 is integral with outer cylinder with wave splines 712 (e.g., gear 710 and outer cylinder with wave splines 712 is manufactured from a single piece of metal stock). In some embodiments, gear 710 is manufactured separately from outer cylinder with wave splines 712. In some embodiments, gear 710 is attached to outer cylinder with wave splines 712 (e.g., attached with a key, by welding, heat fusing, shrink fitting, press fitting, or by any other appropriate means). In the example shown, gear 710 is coupled to drive shaft 704 by a TTC comprising wave splines 706, threaded region 708, outer cylinder with wave splines 712, and nut 714. In various embodiments, stepper motor 702 with gear 710 is used to drive a driven shaft, a driven gear (e.g., a gear that fits the teeth pattern of gear 710), a belt or chain (e.g., a belt or chain used to couple to a driven shaft or driven gear), or to drive and/or precisely position a pan tilt unit, an antenna, a telescope, a camera (e.g., a security camera, a surveillance camera, an infrared camera, etc.), a zoom lens mechanism, a valve control, a hard disk drive, a robot, a vending machine feed or delivery system, a production line, or any other appropriate use.

Figure 7B:
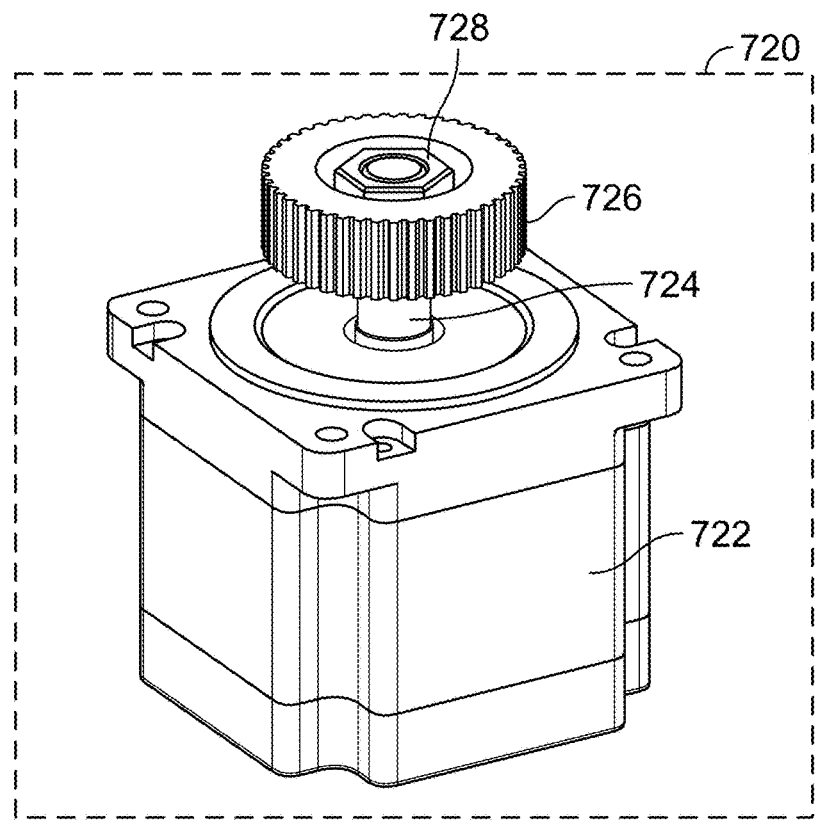
FIG. 7B is a block diagram illustrating a perspective view of an embodiment of a stepper motor assembly utilizing a torque transferring coupler.

FIG. 7B is a block diagram illustrating a perspective view of an embodiment of a stepper motor assembly utilizing a torque transferring coupler. In the example shown, stepper motor assembly with gear 720 comprises stepper motor 722, drive shaft 724, gear 726, and nut 728. In the example shown, stepper motor with gear assembly 720 is a perspective view of stepper motor with gear assembly 700 of FIG. 7A, wherein nut 728 has secured gear 726 to drive shaft 724 (i.e., using the TTC as shown in FIG. 7A).

Figure 7C:
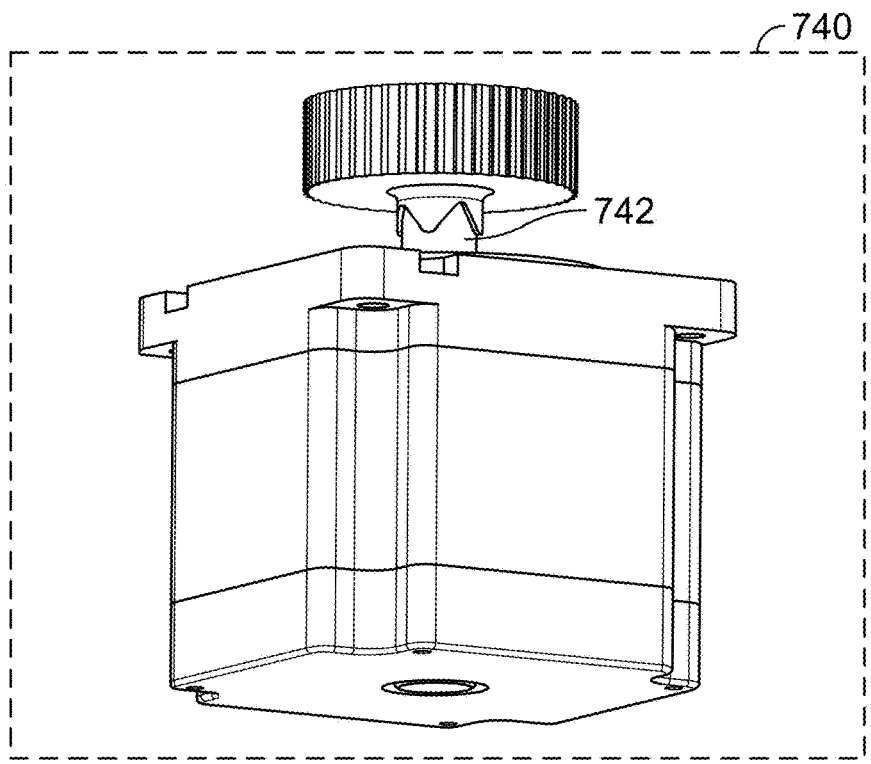
FIG. 7C is a block diagram illustrating a perspective view of an embodiment of a torque transferring coupler utilized as part of a stepper motor assembly.

FIG. 7C is a block diagram illustrating a perspective view of an embodiment of a torque transferring coupler utilized as part of a stepper motor assembly. In the example shown, stepper motor assembly with gear 740 is a perspective view of stepper motor assembly with gear 720 of FIG. 7B, wherein TTC 742 is visible. In some embodiments, TTC 742 comprises drive shaft 704 with wave splines 706 and threaded region 708, along with outer cylinder with wave splines 712 and nut 714 of FIG. 7A.

Figure 8:
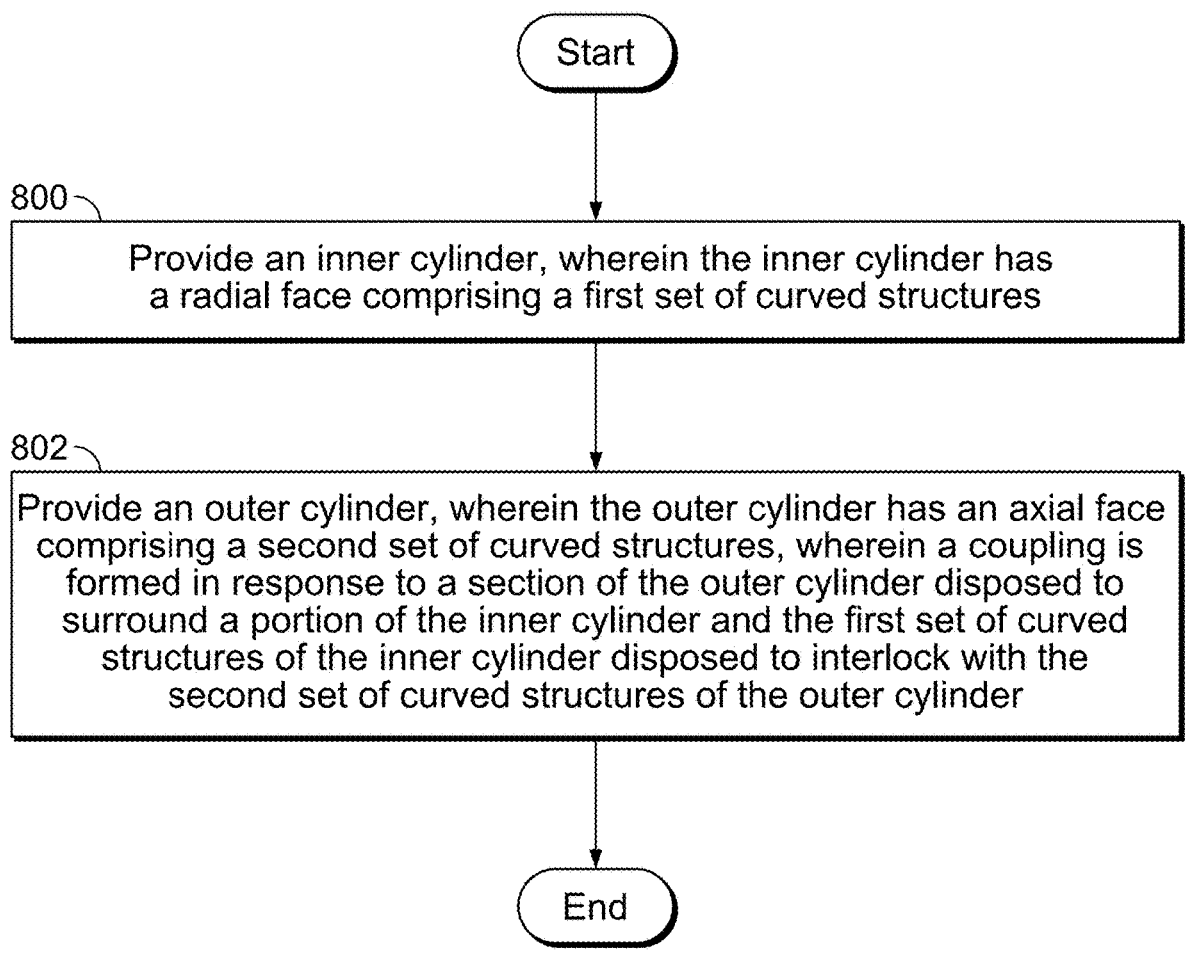
FIG. 8 is a flow diagram illustrating an embodiment of a method for providing a torque transferring coupler.

FIG. 8 is a flow diagram illustrating an embodiment of a method for providing a torque transferring coupler. In 800, an inner cylinder is provided, wherein the inner cylinder has a radial face comprising a first set of curved structures. In 802, an outer cylinder is provided, wherein the outer cylinder has an axial face comprising a second set of curved structures, wherein a coupling is formed in response to a section of the outer cylinder disposed to surround a portion of the inner cylinder and the first set of curved structures of the inner cylinder disposed to interlock with the second set of curved structures of the outer cylinder, and the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A torque transferring coupler, comprising:
   an inner cylinder, wherein the inner cylinder comprises a central portion and a lower portion comprising first wave splines, wherein an upper axial face of the first wave splines is defined by an upper outer edge and an upper inner edge along which the central portion and the first wave splines connect, wherein the upper axial face has a uniform radial thickness defined by a radial distance between the upper inner edge and the upper outer edge, and wherein an axial length of the lower portion of the inner cylinder varies in an oscillating manner as the inner cylinder rotates about its axis to form a first wave profile corresponding to shapes of the first wave splines; and
   an outer cylinder, wherein the outer cylinder is hollow and comprises second wave splines, wherein the second wave splines have a lower axial face defined by a lower outer edge and a lower inner edge, wherein the lower axial face has a uniform radial thickness defined by a radial distance between the lower inner edge and the lower outer edge, and wherein an axial length of the second wave splines varies in an oscillating manner as the outer cylinder rotates about its axis to form a second wave profile corresponding to shapes of the second wave splines, wherein a coupling is formed in response to a section of the outer cylinder disposed to surround a portion of the inner cylinder and the first wave splines disposed to interlock with the second wave splines.

2. The coupler of claim 1, wherein an upper portion of the inner cylinder is threaded.

3. The coupler of claim 2, further comprising a nut, wherein the nut couples to the threaded upper portion of the inner cylinder.

4. The coupler of claim 1, further comprising a nut, wherein the nut is disposed to secure the coupling.

5. The coupler of claim 4, where the nut comprises one of the following: a hexagonal nut, a square nut, a ring nut, a cap nut, a capstan nut, a dome nut, a wingnut, a thumb nut, a tangential clamp nut, a nylon-insert lock nut, a castellated nut, a pair of jam nuts, a Stover lock nut, a two-way lock nut, a serrated flange lock nut, or a K-lock nut.

6. The coupler of claim 4, wherein the inner cylinder, the outer cylinder, and/or the nut comprise one or more of the following materials: a metal, a plastic, and/or a ceramic.

7. The coupler of claim 1, wherein the first wave splines and the second wave splines interlock with a first point of the upper axial face and second point of the lower axial face.

8. The coupler of claim 1, wherein the first wave splines and the second wave splines interlock with a first section of the upper axial face and a second section of the lower axial face.

9. The coupler of claim 1, wherein the first wave splines and the second wave splines interlock with a first line segment of the upper axial face and a second line segment of the lower axial face.

10. The coupler of claim 1, wherein the first wave splines and the second wave splines have smoothly matching profiles.

11. The coupler of claim 10, wherein the first wave splines and the second wave splines are configured to interlock along the smoothly matching profiles in only one radial alignment.

12. The coupler of claim 1, wherein the first wave splines and the second wave splines are configured to interlock together at any axial offset of more than one axial offsets.

13. The coupler of claim 1, wherein the first wave splines and the second wave splines interlock together providing a low backlash coupling.

14. The coupler of claim 1, wherein the first wave profile and/or the second wave profile has a single frequency.

15. The coupler of claim 1, wherein the first wave profile and/or the second wave profile each comprise multiple frequencies.

16. The coupler of claim 1, wherein the first wave profile and/or the second wave profile each has a single amplitude.

17. The coupler of claim 1, wherein the first wave profile and/or the second wave profile each comprise multiple amplitudes.

18. The coupler of claim 1, wherein an upper portion of the outer cylinder comprises a flange.

\* \* \* \* \*